US009999983B2

(12) United States Patent
Suzuki et al.

(10) Patent No.: US 9,999,983 B2
(45) Date of Patent: Jun. 19, 2018

(54) CHIPPING-PROOF INORGANIC SOLID-STATE MATERIAL AND CHIPPING-PROOF EDGE TOOL

(71) Applicant: JAPAN AVIATION ELECTRONICS INDUSTRY, LIMITED, Tokyo (JP)

(72) Inventors: Akiko Suzuki, Tokyo (JP); Akinobu Sato, Tokyo (JP)

(73) Assignee: JAPAN AVIATION ELECTRONICS INDUSTRY, LIMITED, Tokyo (JP)

( * ) Notice: Subject to any disclaimer, the term of this patent is extended or adjusted under 35 U.S.C. 154(b) by 1062 days.

(21) Appl. No.: 13/968,514

(22) Filed: Aug. 16, 2013

(65) Prior Publication Data

US 2014/0065363 A1 Mar. 6, 2014

(30) Foreign Application Priority Data

Aug. 31, 2012 (JP) ................................ 2012-192415

(51) Int. Cl.
*B62D 1/00* (2006.01)
*B26D 1/00* (2006.01)

(52) U.S. Cl.
CPC ...... *B26D 1/0006* (2013.01); *B26D 2001/002* (2013.01); *Y10T 428/24355* (2015.01)

(58) Field of Classification Search
CPC .. B26D 1/0006; B26D 2001/002; B32B 3/30; C23F 4/00; B21D 37/18; H01J 37/317; Y10T 428/24446; Y10T 428/12389; Y10T 428/24355; Y10T 428/24479
USPC .......................................................... 428/141
See application file for complete search history.

(56) References Cited

U.S. PATENT DOCUMENTS 6,838,151 B2 * 1/2005 Kato .................. C23C 14/0641 204/192.38
7,691,496 B2 * 4/2010 Park ......................... C23C 4/12 428/141
8,435,624 B2 * 5/2013 Weerasinghe ........ B23B 27/146 428/141

(Continued)

FOREIGN PATENT DOCUMENTS

CN 101563759 A 10/2009
DE 10 2013 210277 A1 1/2014

(Continued)

OTHER PUBLICATIONS

Author Unknown, Mar. 2008, Tribo Hartmetall, Cemented Carbide Data Sheet.*

(Continued)

*Primary Examiner* — Nathan L Van Sell
(74) *Attorney, Agent, or Firm* — Greenblum & Bernstein, P.L.C.

(57) ABSTRACT

A chipping-proof nonmetal inorganic solid-state material is characterized in that the inorganic solid-state material has, in at least a part of a surface thereof, a surface structure in which a network of recesses and protuberances surrounded by the recesses are formed, the protuberances have an average width of 5 nm to 50 nm, a physical property of the surface structure differs from the physical property of an interior of the inorganic solid-state material lying below the surface structure, and there is no solid-solid interface between the surface structure and the interior of the inorganic solid-state material.

25 Claims, 37 Drawing Sheets

(56) References Cited

U.S. PATENT DOCUMENTS

| | | | | |
|---|---|---|---|---|
| 2005/0181174 | A1* | 8/2005 | Weerasinghe | B23B 27/146 428/141 |
| 2009/0032725 | A1 | 2/2009 | Hautala | |
| 2009/0198264 | A1 | 8/2009 | Svrluga et al. | |
| 2009/0305507 | A1 | 12/2009 | Suzuki et al. | |
| 2010/0213175 | A1* | 8/2010 | Peng | B24B 9/16 216/96 |
| 2011/0061510 | A1* | 3/2011 | Sato | B21D 37/20 83/651 |
| 2011/0068503 | A1* | 3/2011 | Sato | B29C 33/42 264/219 |
| 2011/0189439 | A1 | 8/2011 | Sato et al. | |
| 2012/0128892 | A1 | 5/2012 | Toyoda et al. | |
| 2014/0007752 | A1 | 1/2014 | Sato et al. | |

FOREIGN PATENT DOCUMENTS

| | | |
|---|---|---|
| JP | 63-65079 A | 3/1988 |
| JP | 08-319184 | 12/1996 |
| JP | 09-41138 | 2/1997 |
| JP | 10-025154 | 1/1998 |
| JP | 2007-230807 | 9/2007 |
| JP | 2010-036297 | 2/2010 |
| JP | 2011-062975 | 3/2011 |
| JP | 2011-157251 | 8/2011 |
| JP | 2011-157595 | 8/2011 |
| JP | 2011-246761 | 12/2011 |
| JP | 2011-253983 | 12/2011 |
| JP | 2011-256104 | 12/2011 |

OTHER PUBLICATIONS

U.S. Appl. No. 14/054,058 to Akinobu Sato et al., filed Oct. 15, 2013.

Hitoshi Sumiya et al., "SEI Technical Review, vol. 172", Jan. 2008, pp. 82-88.

Isao Yamada, "Basic and Application of Cluster Ion Beam", Oct. 31, 2006, pp. 130-131.

Chinese Office action, dated Feb. 16, 2015 along with an English translation thereof.

German Office action, dated Feb. 19, 2015 along with an English translation thereof.

Japan Office action, dated Mar. 18, 2014.

Japan Office action, dated Sep. 24, 2014, together with an English translation.

Office Action issued in China Family Member Patent Appl. No. 201310378806.X, dated Sep. 9, 2015, along with an English translation thereof.

Japanese Decision of Rejection, dated Dec. 2, 2014.

Office Action issued in Japan Family member Patent Appl. No. 2015-013425, dated Jan. 12, 2016 , along with an English translation thereof.

Office Action issued in Japan Family member Patent Appl. No. 2012-192415, dated Dec. 22, 2015 , along with an English translation thereof.

Office Action issued in Japan Family Member Patent Appl. No. 2015-013425, dated Nov. 10, 2015, along with an English translation thereof.

* cited by examiner

FIG.10

| | Material | Processing | Hardness ratio (surface structure/interior) | Surface structure | | Density (surface structure) | | Chipping occurrence rate |
|---|---|---|---|---|---|---|---|---|
| | | | | Size of protuberance | Size of dense region | Density of protuberances | Density of dense regions | |
| | | | (%) | (nm) | (nm) | Protuberances/$\mu m^2$ | Dense regions/$\mu m^2$ | (%) |
| Comparative example 1 | Single-crystal diamond | - | - | 0 | - | - | - | 100 |
| Comparative example 2 | Single-crystal diamond | GCIB | 90 | 3 | - | 1434 | - | 89 |
| Example 1 | Single-crystal diamond | GCIB | 85 | 5 | - | 2167 | - | 14 |
| Example 2 | Single-crystal diamond | GCIB | 74 | 8 | - | 2301 | - | 10 |
| Example 3 | Single-crystal diamond | GCIB | 72 | 15 | - | 2558 | - | 5 |
| Example 4 | Single-crystal diamond | GCIB | 68 | 23 | - | 1872 | - | 3 |
| Example 5 | Single-crystal diamond | GCIB | 47 | 50 | - | 433 | - | 9 |
| Comparative example 3 | Single-crystal diamond | GCIB | 24 | 67 | - | 121 | - | 50 |
| Comparative example 4 | Single-crystal diamond | GCIB | 15 | 80 | - | 66 | - | 62 |
| Comparative example 5 | Single-crystal diamond | GCIB | 14 | 100 | - | 43 | - | 69 |
| Example 6 | Single-crystal diamond | GCIB | 10 | 20 | 51 | 2049 | 200 | 0 |
| Example 7 | Single-crystal diamond | GCIB | 10 | 22 | 121 | 1853 | 76 | 0 |
| Example 8 | Single-crystal diamond | GCIB | 10 | 25 | 286 | 1295 | 15 | 0 |
| Example 9 | Single-crystal diamond | GCIB | 10 | 23 | 503 | 1945 | 10 | 0 |
| Comparative example 6 | Single-crystal diamond | Patterning | 100 | 50 | - | 100 | - | 100 |
| Comparative example 7 | Single-crystal diamond/DLC | Deposition | 25 | 25 | - | 1501 | - | 100 |

FIG.12

| | Material | Processing | Hardness ratio (surface structure/interior) | Surface structure | | Density (surface structure) | | Chipping occurrence rate |
|---|---|---|---|---|---|---|---|---|
| | | | | Size of protuberance | Size of dense region | Density of protuberances | Density of dense regions | |
| | | | (%) | (nm) | (nm) | Protuberances/$\mu m^2$ | Dense regions/$\mu m^2$ | (%) |
| Comparative example 8 | Sintered diamond | - | - | 0 | - | - | - | 100 |
| Comparative example 9 | Sintered diamond | GCIB | 95 | 3 | - | 1389 | - | 95 |
| Example 10 | Sintered diamond | GCIB | 90 | 5 | - | 2043 | - | 18 |
| Example 11 | Sintered diamond | GCIB | 88 | 7 | - | 2428 | - | 15 |
| Example 12 | Sintered diamond | GCIB | 89 | 12 | - | 2693 | - | 10 |
| Example 13 | Sintered diamond | GCIB | 84 | 25 | - | 1621 | - | 5 |
| Example 14 | Sintered diamond | GCIB | 87 | 48 | - | 495 | - | 8 |
| Comparative example 10 | Sintered diamond | GCIB | 76 | 74 | - | 110 | - | 56 |
| Comparative example 11 | Sintered diamond | GCIB | 72 | 83 | - | 55 | - | 67 |
| Comparative example 12 | Sintered diamond | GCIB | 63 | 98 | - | 33 | - | 76 |
| Example 15 | Sintered diamond | GCIB | 37 | 24 | 54 | 1867 | 193 | 0 |
| Example 16 | Sintered diamond | GCIB | 35 | 26 | 151 | 1695 | 110 | 0 |
| Example 17 | Sintered diamond | GCIB | 34 | 28 | 329 | 947 | 34 | 0 |
| Example 18 | Sintered diamond | GCIB | 32 | 26 | 484 | 1167 | 15 | 0 |
| Comparative example 13 | Sintered diamond | Patterning | 100 | 50 | - | 100 | - | 100 |
| Comparative example 14 | Sintered diamond/DLC | Deposition | 79 | 25 | - | 1548 | - | 100 |

FIG.14

| | Material | Processing | Hardness ratio (surface structure/interior) | Surface structure | | Density (surface structure) | | Chipping occurrence rate |
|---|---|---|---|---|---|---|---|---|
| | | | | Size of protuberance | Size of dense region | Density of protuberances | Density of dense regions | |
| | | | (%) | (nm) | (nm) | Protuberances/$\mu m^2$ | Dense regions/$\mu m^2$ | (%) |
| Comparative example 15 | Binderless cBN | - | - | 0 | - | - | - | 100 |
| Comparative example 16 | Binderless cBN | GCIB | 94 | 3 | - | 1647 | - | 92 |
| Example 19 | Binderless cBN | GCIB | 88 | 5 | - | 2189 | - | 28 |
| Example 20 | Binderless cBN | GCIB | 86 | 7 | - | 2283 | - | 15 |
| Example 21 | Binderless cBN | GCIB | 78 | 10 | - | 2334 | - | 6 |
| Example 22 | Binderless cBN | GCIB | 69 | 20 | - | 1561 | - | 4 |
| Example 23 | Binderless cBN | GCIB | 56 | 49 | - | 412 | - | 9 |
| Comparative example 17 | Binderless cBN | GCIB | 48 | 73 | - | 105 | - | 58 |
| Comparative example 18 | Binderless cBN | GCIB | 32 | 85 | - | 47 | - | 68 |
| Comparative example 19 | Binderless cBN | GCIB | 25 | 99 | - | 33 | - | 70 |
| Example 24 | Binderless cBN | GCIB | 19 | 14 | 56 | 1943 | 180 | 0 |
| Example 25 | Binderless cBN | GCIB | 20 | 20 | 110 | 1758 | 90 | 0 |
| Example 26 | Binderless cBN | GCIB | 21 | 22 | 346 | 1784 | 25 | 0 |
| Example 27 | Binderless cBN | GCIB | 18 | 19 | 453 | 1841 | 12 | 0 |
| Comparative example 20 | Binderless cBN | Patterning | 100 | 50 | - | 100 | - | 100 |
| Comparative example 21 | Binderless cBN/DLC | Deposition | 60 | 25 | - | 1534 | - | 100 |

FIG.16

| | Material | Processing | Young's modulus ratio (surface structure/interior) | Surface structure | | Density (surface structure) | | Chipping occurrence rate |
|---|---|---|---|---|---|---|---|---|
| | | | | Size of protuberance | Size of dense region | Density of protuberances | Density of dense regions | |
| | | | (%) | (nm) | (nm) | Protuberances/ $\mu m^2$ | Dense regions/ $\mu m^2$ | (%) |
| Comparative example 22 | Single-crystal diamond | - | - | 0 | - | - | - | 100 |
| Comparative example 23 | Single-crystal diamond | GCIB | 95 | 3 | - | 1942 | - | 91 |
| Example 28 | Single-crystal diamond | GCIB | 93 | 5 | - | 2559 | - | 27 |
| Example 29 | Single-crystal diamond | GCIB | 83 | 8 | - | 2285 | - | 17 |
| Example 30 | Single-crystal diamond | GCIB | 72 | 12 | - | 2345 | - | 8 |
| Example 31 | Single-crystal diamond | GCIB | 68 | 30 | - | 1034 | - | 5 |
| Example 32 | Single-crystal diamond | GCIB | 51 | 49 | - | 292 | - | 9 |
| Comparative example 24 | Single-crystal diamond | GCIB | 53 | 77 | - | 112 | - | 54 |
| Comparative example 25 | Single-crystal diamond | GCIB | 49 | 98 | - | 54 | - | 64 |
| Comparative example 26 | Single-crystal diamond | GCIB | 45 | 104 | - | 37 | - | 70 |
| Example 33 | Single-crystal diamond | GCIB | 30 | 25 | 55 | 1845 | 290 | 0 |
| Example 34 | Single-crystal diamond | GCIB | 31 | 23 | 144 | 1668 | 72 | 0 |
| Example 35 | Single-crystal diamond | GCIB | 28 | 22 | 317 | 1173 | 18 | 0 |
| Example 36 | Single-crystal diamond | GCIB | 28 | 28 | 495 | 1242 | 11 | 0 |
| Comparative example 27 | Single-crystal diamond | Patterning | 100 | 50 | - | 100 | - | 100 |
| Comparative example 28 | Single-crystal diamond/DLC | Deposition | 55 | 25 | - | 1559 | - | 100 |

FIG.18

| | Material | Processing | Young's modulus ratio (surface structure/interior) | Surface structure | | Density (surface structure) | | Chipping occurrence rate |
|---|---|---|---|---|---|---|---|---|
| | | | | Size of protuberance | Size of dense region | Density of protuberances | Density of dense regions | |
| | | | (%) | (nm) | (nm) | Protuberances/μm$^2$ | Dense regions/μm$^2$ | (%) |
| Comparative example 29 | Sintered diamond | - | - | 0 | - | - | - | 100 |
| Comparative example 30 | Sintered diamond | GCIB | 98 | 3 | - | 1245 | - | 96 |
| Example 37 | Sintered diamond | GCIB | 94 | 5 | - | 2279 | - | 31 |
| Example 38 | Sintered diamond | GCIB | 92 | 7 | - | 2135 | - | 23 |
| Example 39 | Sintered diamond | GCIB | 90 | 13 | - | 2533 | - | 13 |
| Example 40 | Sintered diamond | GCIB | 91 | 21 | - | 2157 | - | 9 |
| Example 41 | Sintered diamond | GCIB | 88 | 50 | - | 331 | - | 12 |
| Comparative example 31 | Sintered diamond | GCIB | 84 | 73 | - | 93 | - | 55 |
| Comparative example 32 | Sintered diamond | GCIB | 85 | 95 | - | 54 | - | 65 |
| Comparative example 33 | Sintered diamond | GCIB | 81 | 110 | - | 32 | - | 69 |
| Example 42 | Sintered diamond | GCIB | 74 | 18 | 51 | 2934 | 340 | 0 |
| Example 43 | Sintered diamond | GCIB | 72 | 20 | 174 | 2662 | 43 | 0 |
| Example 44 | Sintered diamond | GCIB | 70 | 24 | 325 | 2494 | 19 | 0 |
| Example 45 | Sintered diamond | GCIB | 68 | 22 | 502 | 2147 | 8 | 0 |
| Comparative example 34 | Sintered diamond | Patterning | 100 | 50 | - | 100 | - | 100 |
| Comparative example 35 | Sintered diamond/DLC | Deposition | 100 | 25 | - | 1529 | - | 100 |

FIG.20

| | Material | Processing | Young's modulus ratio (surface structure/interior) | Surface structure | | Density (surface structure) | | Chipping occurrence rate |
|---|---|---|---|---|---|---|---|---|
| | | | | Size of protuberance | Size of dense region | Density of protuberances | Density of dense regions | |
| | | | (%) | (nm) | (nm) | Protuberances/$\mu m^2$ | Dense regions/$\mu m^2$ | (%) |
| Comparative example 36 | Binderless cBN | - | - | 0 | - | - | - | 100 |
| Comparative example 37 | Binderless cBN | GCIB | 98 | 3 | - | 1122 | - | 91 |
| Example 46 | Binderless cBN | GCIB | 96 | 5 | - | 1967 | - | 26 |
| Example 47 | Binderless cBN | GCIB | 94 | 9 | - | 2279 | - | 20 |
| Example 48 | Binderless cBN | GCIB | 94 | 14 | - | 2484 | - | 7 |
| Example 49 | Binderless cBN | GCIB | 91 | 24 | - | 2099 | - | 9 |
| Example 50 | Binderless cBN | GCIB | 89 | 48 | - | 418 | - | 9 |
| Comparative example 38 | Binderless cBN | GCIB | 90 | 73 | - | 83 | - | 52 |
| Comparative example 39 | Binderless cBN | GCIB | 85 | 93 | - | 44 | - | 65 |
| Comparative example 40 | Binderless cBN | GCIB | 85 | 101 | - | 26 | - | 60 |
| Example 51 | Binderless cBN | GCIB | 79 | 20 | 53 | 2355 | 340 | 0 |
| Example 52 | Binderless cBN | GCIB | 77 | 21 | 236 | 2384 | 43 | 0 |
| Example 53 | Binderless cBN | GCIB | 78 | 19 | 397 | 2249 | 19 | 0 |
| Example 54 | Binderless cBN | GCIB | 77 | 18 | 488 | 2042 | 8 | 0 |
| Comparative example 41 | Binderless cBN | Patterning | 100 | 50 | - | 100 | - | 100 |
| Comparative example 42 | Binderless cBN/DLC | Deposition | 98 | 25 | - | 1533 | - | 100 |

FIG.22

| | Material | Processing | Density ratio (surface structure/interior) | Surface structure | | Density (surface structure) | | Chipping occurrence rate |
|---|---|---|---|---|---|---|---|---|
| | | | | Size of protuberance | Size of dense region | Density of protuberances | Density of dense regions | |
| | | | (%) | (nm) | (nm) | Protuberances/μm$^2$ | Dense regions/μm$^2$ | (%) |
| Comparative example 43 | Single-crystal diamond | - | - | 0 | - | - | - | 100 |
| Comparative example 44 | Single-crystal diamond | GCIB | 95 | 3 | - | 1543 | - | 94 |
| Example 55 | Single-crystal diamond | GCIB | 93 | 5 | - | 2278 | - | 28 |
| Example 56 | Single-crystal diamond | GCIB | 90 | 7 | - | 2155 | - | 21 |
| Example 57 | Single-crystal diamond | GCIB | 86 | 11 | - | 2437 | - | 9 |
| Example 58 | Single-crystal diamond | GCIB | 83 | 24 | - | 1768 | - | 6 |
| Example 59 | Single-crystal diamond | GCIB | 80 | 50 | - | 394 | - | 9 |
| Comparative example 45 | Single-crystal diamond | GCIB | 78 | 78 | - | 140 | - | 50 |
| Comparative example 46 | Single-crystal diamond | GCIB | 78 | 89 | - | 74 | - | 59 |
| Comparative example 47 | Single-crystal diamond | GCIB | 76 | 100 | - | 32 | - | 60 |
| Example 60 | Single-crystal diamond | GCIB | 70 | 15 | 53 | 1906 | 200 | 0 |
| Example 61 | Single-crystal diamond | GCIB | 71 | 20 | 191 | 1753 | 76 | 0 |
| Example 62 | Single-crystal diamond | GCIB | 70 | 22 | 356 | 1339 | 15 | 0 |
| Example 63 | Single-crystal diamond | GCIB | 71 | 24 | 505 | 1805 | 10 | 0 |
| Comparative example 48 | Single-crystal diamond | Patterning | 100 | 50 | - | 100 | - | 100 |
| Comparative example 49 | Single-crystal diamond/DLC | Deposition | 85 | 25 | - | 1556 | - | 100 |

FIG.24

| | Material | Processing | Density ratio (surface structure/interior) | Surface structure | | Density (surface structure) | | Chipping occurrence rate |
|---|---|---|---|---|---|---|---|---|
| | | | | Size of protuberance | Size of dense region | Density of protuberances | Density of dense regions | |
| | | | (%) | (nm) | (nm) | Protuberances/μm$^2$ | Dense regions/μm$^2$ | (%) |
| Comparative example 50 | Sintered diamond | - | - | 0 | - | - | - | 100 |
| Comparative example 51 | Sintered diamond | GCIB | 97 | 3 | - | 1034 | - | 92 |
| Example 64 | Sintered diamond | GCIB | 96 | 5 | - | 1845 | - | 24 |
| Example 65 | Sintered diamond | GCIB | 94 | 7 | - | 2139 | - | 20 |
| Example 66 | Sintered diamond | GCIB | 90 | 10 | - | 2148 | - | 15 |
| Example 67 | Sintered diamond | GCIB | 87 | 23 | - | 1956 | - | 10 |
| Example 68 | Sintered diamond | GCIB | 85 | 49 | - | 420 | - | 13 |
| Comparative example 52 | Sintered diamond | GCIB | 84 | 70 | - | 104 | - | 55 |
| Comparative example 53 | Sintered diamond | GCIB | 84 | 84 | - | 54 | - | 60 |
| Comparative example 54 | Sintered diamond | GCIB | 82 | 102 | - | 27 | - | 66 |
| Example 69 | Sintered diamond | GCIB | 78 | 14 | 52 | 1834 | 180 | 0 |
| Example 70 | Sintered diamond | GCIB | 76 | 20 | 124 | 1659 | 100 | 0 |
| Example 71 | Sintered diamond | GCIB | 76 | 22 | 305 | 909 | 25 | 0 |
| Example 72 | Sintered diamond | GCIB | 74 | 26 | 474 | 1142 | 18 | 0 |
| Comparative example 55 | Sintered diamond | Patterning | 100 | 50 | - | 100 | - | 100 |
| Comparative example 56 | Sintered diamond/DLC | Deposition | 85 | 25 | - | 1562 | - | 100 |

FIG.26

| | Material | Processing | Density ratio (surface structure/interior) | Surface structure | | Density (surface structure) | | Chipping occurrence rate |
|---|---|---|---|---|---|---|---|---|
| | | | | Size of protuberance | Size of dense region | Density of protuberances | Density of dense regions | |
| | | | (%) | (nm) | (nm) | Protuberances/$\mu m^2$ | Dense regions/$\mu m^2$ | (%) |
| Comparative example 57 | Binderless cBN | - | - | 0 | - | - | - | 100 |
| Comparative example 58 | Binderless cBN | GCIB | 96 | 3 | - | 1301 | - | 95 |
| Example 73 | Binderless cBN | GCIB | 96 | 5 | - | 2034 | - | 21 |
| Example 74 | Binderless cBN | GCIB | 93 | 8 | - | 2135 | - | 17 |
| Example 75 | Binderless cBN | GCIB | 93 | 12 | - | 2269 | - | 11 |
| Example 76 | Binderless cBN | GCIB | 90 | 20 | - | 1914 | - | 7 |
| Example 77 | Binderless cBN | GCIB | 88 | 49 | - | 360 | - | 9 |
| Comparative example 59 | Binderless cBN | GCIB | 89 | 75 | - | 74 | - | 50 |
| Comparative example 60 | Binderless cBN | GCIB | 83 | 87 | - | 40 | - | 54 |
| Comparative example 61 | Binderless cBN | GCIB | 81 | 99 | - | 36 | - | 53 |
| Example 78 | Binderless cBN | GCIB | 78 | 15 | 51 | 1706 | 180 | 0 |
| Example 79 | Binderless cBN | GCIB | 77 | 20 | 211 | 1662 | 90 | 0 |
| Example 80 | Binderless cBN | GCIB | 78 | 23 | 426 | 1511 | 25 | 0 |
| Example 81 | Binderless cBN | GCIB | 76 | 25 | 499 | 1360 | 12 | 0 |
| Comparative example 62 | Binderless cBN | Patterning | 100 | 50 | - | 100 | - | 100 |
| Comparative example 63 | Binderless cBN/DLC | Deposition | 97 | 25 | - | 1555 | - | 100 |

FIG.28

| | Material | Processing | Crystallization ratio | Surface structure | | Density (surface structure) | | Chipping occurrence rate |
|---|---|---|---|---|---|---|---|---|
| | | | | Size of protuberance | Size of dense region | Density of protuberances | Density of dense regions | |
| | | | (%) | (nm) | (nm) | Protuberances/$\mu m^2$ | Dense regions/$\mu m^2$ | (%) |
| Comparative example 64 | Single-crystal diamond | - | - | 0 | - | - | - | 100 |
| Comparative example 65 | Single-crystal diamond | GCIB | 70 | 3 | - | 1357 | - | 94 |
| Example 82 | Single-crystal diamond | GCIB | 63 | 5 | - | 2290 | - | 20 |
| Example 83 | Single-crystal diamond | GCIB | 43 | 7 | - | 2131 | - | 12 |
| Example 84 | Single-crystal diamond | GCIB | 32 | 11 | - | 2323 | - | 9 |
| Example 85 | Single-crystal diamond | GCIB | 25 | 25 | - | 1758 | - | 5 |
| Example 86 | Single-crystal diamond | GCIB | 16 | 50 | - | 413 | - | 9 |
| Comparative example 66 | Single-crystal diamond | GCIB | 12 | 71 | - | 90 | - | 56 |
| Comparative example 67 | Single-crystal diamond | GCIB | 10 | 90 | - | 54 | - | 67 |
| Comparative example 68 | Single-crystal diamond | GCIB | 10 | 100 | - | 33 | - | 63 |
| Example 87 | Single-crystal diamond | GCIB | 9 | 18 | 53 | 1807 | 180 | 0 |
| Example 88 | Single-crystal diamond | GCIB | 9 | 23 | 191 | 1784 | 75 | 0 |
| Example 89 | Single-crystal diamond | GCIB | 10 | 22 | 392 | 1042 | 18 | 0 |
| Example 90 | Single-crystal diamond | GCIB | 10 | 25 | 497 | 1548 | 11 | 0 |
| Comparative example 69 | Single-crystal diamond | Patterning | 100 | 50 | - | 10 | - | 100 |
| Comparative example 70 | Single-crystal diamond/DLC | Deposition | 10 | 25 | - | 1569 | - | 100 |

FIG.30

| | Material | Processing | Crystallization ratio | Surface structure | | Density (surface structure) | | Chipping occurrence rate |
|---|---|---|---|---|---|---|---|---|
| | | | | Size of protuberance | Size of dense region | Density of protuberances | Density of dense regions | |
| | | | (%) | (nm) | (nm) | Protuberances/$\mu m^2$ | Dense regions/$\mu m^2$ | (%) |
| Comparative example 71 | Sintered diamond | - | - | 0 | - | - | - | 100 |
| Comparative example 72 | Sintered diamond | GCIB | 77 | 3 | - | 1274 | - | 96 |
| Example 91 | Sintered diamond | GCIB | 69 | 5 | - | 1948 | - | 22 |
| Example 92 | Sintered diamond | GCIB | 46 | 8 | - | 2379 | - | 10 |
| Example 93 | Sintered diamond | GCIB | 35 | 13 | - | 2404 | - | 8 |
| Example 94 | Sintered diamond | GCIB | 27 | 26 | - | 1700 | - | 7 |
| Example 95 | Sintered diamond | GCIB | 18 | 49 | - | 410 | - | 9 |
| Comparative example 73 | Sintered diamond | GCIB | 14 | 75 | - | 953 | - | 50 |
| Comparative example 74 | Sintered diamond | GCIB | 13 | 87 | - | 44 | - | 55 |
| Comparative example 75 | Sintered diamond | GCIB | 11 | 101 | - | 36 | - | 59 |
| Example 96 | Sintered diamond | GCIB | 10 | 26 | 52 | 1749 | 170 | 0 |
| Example 97 | Sintered diamond | GCIB | 11 | 22 | 205 | 1603 | 105 | 0 |
| Example 98 | Sintered diamond | GCIB | 10 | 24 | 344 | 945 | 34 | 0 |
| Example 99 | Sintered diamond | GCIB | 10 | 29 | 521 | 1063 | 12 | 0 |
| Comparative example 76 | Sintered diamond | Patterning | 100 | 50 | - | 100 | - | 100 |
| Comparative example 77 | Sintered diamond/DLC | Deposition | 10 | 25 | - | 1504 | - | 100 |

FIG.32

| | Material | Processing | Crystallization ratio | Surface structure | | Density (surface structure) | | Chipping occurrence rate |
|---|---|---|---|---|---|---|---|---|
| | | | | Size of protuberance | Size of dense region | Density of protuberances | Density of dense regions | |
| | | | (%) | (nm) | (nm) | Protuberances/ $\mu m^2$ | Dense regions/ $\mu m^2$ | (%) |
| Comparative example 78 | Binderless cBN | - | - | 0 | - | - | - | 100 |
| Comparative example 79 | Binderless cBN | GCIB | 85 | 3 | - | 1756 | - | 95 |
| Example 100 | Binderless cBN | GCIB | 78 | 5 | - | 2089 | - | 20 |
| Example 101 | Binderless cBN | GCIB | 68 | 8 | - | 2123 | - | 11 |
| Example 102 | Binderless cBN | GCIB | 56 | 15 | - | 2167 | - | 8 |
| Example 103 | Binderless cBN | GCIB | 40 | 25 | - | 1905 | - | 6 |
| Example 104 | Binderless cBN | GCIB | 32 | 49 | - | 361 | - | 9 |
| Comparative example 80 | Binderless cBN | GCIB | 23 | 70 | - | 92 | - | 54 |
| Comparative example 81 | Binderless cBN | GCIB | 18 | 83 | - | 45 | - | 60 |
| Comparative example 82 | Binderless cBN | GCIB | 16 | 100 | - | 23 | - | 60 |
| Example 105 | Binderless cBN | GCIB | 14 | 18 | 51 | 2067 | 150 | 0 |
| Example 106 | Binderless cBN | GCIB | 13 | 23 | 126 | 1656 | 85 | 0 |
| Example 107 | Binderless cBN | GCIB | 14 | 24 | 304 | 1768 | 31 | 0 |
| Example 108 | Binderless cBN | GCIB | 14 | 29 | 484 | 1783 | 10 | 0 |
| Comparative example 83 | Binderless cBN | Patterning | 100 | 50 | - | 100 | - | 100 |
| Comparative example 84 | Binderless cBN/DLC | Deposition | 10 | 25 | - | 1544 | - | 100 |

CHIPPING-PROOF INORGANIC SOLID-STATE MATERIAL AND CHIPPING-PROOF EDGE TOOL

TECHNICAL FIELD

The present invention relates to a nonmetal inorganic solid-state material that is unlikely to crack or chip when an impact is given to the material, and to an edge tool having a cutting edge made of the inorganic solid-state material.

BACKGROUND ART

Structural materials, functional materials, machine part materials, die materials, tool materials and other solid-state materials, such as glass, ceramics, diamond, cubic boron nitride (cBN) and tungsten carbide, are required to have an improved strength. To improve the strength means to prevent a chipping or cracking of a solid-state material when a force is applied to the solid-state material by a sporadic impact, repeated impacts or sliding.

In particular, high-hardness materials, such as diamond, binderless cBN sintered body and tungsten carbide, have a wear resistance and therefore are used for dies or edge tools such as cutting tools. However, these materials are brittle materials having low ductility and tend to crack, chip or otherwise break when an impact is applied thereto. Unlike metals, these nonmetal brittle materials are hardly plastically deformed. Therefore, when an impact is applied to these materials, the stress is concentrated at a small scratch in the surface formed during the manufacturing process to serve to extend the scratch. As a result, the scratch extends, and a cracking or chipping develops from the scratch.

A commonly known technique to improve the strength of a brittle material is to planarize the surface of the brittle material to remove a scratch or defect in the surface. Mechanical polishing using abrasive grain has been used for any material. Furthermore, Patent Literature 1 (Japanese Patent Application Laid Open No. 2007-230807) discloses a thermochemical polishing technique that removes micro cracks on a surface resulting from mechanical polishing as a technique for manufacturing a diamond product having high resistance to chipping.

Furthermore, a technique for improving the strength of glass is also a known technique for improving the strength of a brittle material. If a compressive stress is produced in the surface of glass, a scratch on the surface of the glass can be prevented from extending even if a force is applied to the scratch. Besides, a chemical reinforcement method (ion exchange method) is a glass reinforcing technique that involves immersing glass in a potassium nitrate ($KNO_3$) solution to replace sodium ions ($Na^+$) having a smaller diameter in the glass surface layer with potassium ions ($K^+$) having a larger diameter, thereby producing a compressive stress in the glass surface (see Patent Literature 2 (Japanese Patent Application Laid Open No. 2011-256104)).

Furthermore, fiber-reinforced ceramics is also a known technique for improving the strength of a brittle material. For example, if several thousands or several tens of thousands of carbon or silicon carbide (SiC) fibers having a diameter of several μm to several tens of μm are bundled, although brittle fracture of each fiber occurs, brittle fracture of the fiber bundle is prevented because the fracture occurs in relatively small units. The fiber-reinforced ceramics is a composite material formed by binding a fabric of such fiber bundles with ceramics (see Patent Literature 3 (Japanese Patent Application Laid Open No. 2011-157251, for example)).

In the case where a surface of a solid-state material is planarized by mechanical polishing, scratches larger than the abrasive grain can be removed, but it is difficult to perfectly remove scratches formed by polishing with the abrasive grain. The thermochemical polishing technique disclosed in Patent Literature 1 takes advantage of the oxidation-reduction reaction between diamond and copper and cannot be applied to other solid-state materials than diamond. The techniques disclosed in Patent Literatures 2 and 3 are restricted in the solid-state materials to which the techniques can be applied.

SUMMARY OF THE INVENTION

In view of such circumstances, an object of the present invention is to provide a nonmetal inorganic solid-state material that is unlikely to crack or chip when an impact is given to the material, and an edge tool having a cutting edge made of the inorganic solid-state material.

The present invention provides a chipping-proof nonmetal inorganic solid-state material, wherein the inorganic solid-state material has, in at least a part of a surface thereof, a surface structure in which a network of recesses and protuberances surrounded by the recesses are formed, the protuberances have an average width of 5 nm to 50 nm, a physical property of the surface structure differs from the physical property of an interior of the inorganic solid-state material lying below the surface structure, and there is no solid-solid interface between the surface structure and the interior of the inorganic solid-state material.

In addition, the present invention provides a chipping-proof nonmetal inorganic solid-state material, wherein the inorganic solid-state material has, in at least a part of a surface thereof, a surface structure in which a network of recesses and protuberances surrounded by the recesses are formed, the protuberances have an average width of 5 nm to 50 nm, a physical property of the surface structure differs from the physical property of an interior of the inorganic solid-state material lying below the surface structure, and there is no solid-solid interface between the surface structure and the interior of the inorganic solid-state material, therefore each of the protuberances has a physical property of readily deforming at least either elastically or plastically in comparison with the interior of the inorganic solid-state material.

In addition, the present invention provides a chipping-proof nonmetal inorganic solid-state material, wherein the inorganic solid-state material has, in at least a part of a surface thereof, a surface structure in which a network of recesses and protuberances surrounded by the recesses are formed, the protuberances have an average width of 5 nm to 50 nm, the Young's modulus of the surface structure is smaller than the Young's modulus of an interior of the inorganic solid-state material lying below the surface structure, and there is no solid-solid interface between the surface structure and the interior of the inorganic solid-state material, therefore each of the protuberances has a physical property of readily deforming at least either elastically or plastically in comparison with the interior of the inorganic solid-state material.

In addition, the present invention provides a chipping-proof nonmetal inorganic solid-state material, wherein the inorganic solid-state material has, in at least a part of a surface thereof, a surface structure in which a network of recesses and protuberances surrounded by the recesses are formed, the protuberances have an average width of 5 nm to 50 nm, the density of the surface structure is smaller than the density of an interior of the inorganic solid-state material lying below the surface structure, and there is no solid-solid interface between the surface structure and the interior of the inorganic solid-state material, therefore each of the protuberances has a physical property of readily deforming at least either elastically or plastically in comparison with the interior of the inorganic solid-state material.

In addition, the present invention provides a chipping-proof nonmetal inorganic solid-state material, wherein the inorganic solid-state material has, in at least a part of a surface thereof, a surface structure in which a network of recesses and protuberances surrounded by the recesses are formed, the protuberances have an average width of 5 nm to 50 nm, the hardness of the surface structure is smaller than the hardness of an interior of the inorganic solid-state material lying below the surface structure, and there is no solid-solid interface between the surface structure and the interior of the inorganic solid-state material, therefore each of the protuberances has a physical property of readily deforming at least either elastically or plastically in comparison with the interior of the inorganic solid-state material.

In addition, the present invention provides a chipping-proof nonmetal inorganic solid-state material, wherein the inorganic solid-state material has, in at least a part of a surface thereof, a surface structure in which a network of recesses and protuberances surrounded by the recesses are formed, the protuberances have an average width of 5 nm to 50 nm, the surface structure has an amorphous structure, an interior of the solid-state material lying below the surface structure has a crystalline structure, and a boundary region between the interior of the inorganic solid-state material and the surface structure has a structure that gradually changes from the crystalline structure to the amorphous structure as it goes from the interior of the inorganic solid-state material to the surface structure, therefore each of the protuberances has a physical property of readily deforming at least either elastically or plastically in comparison with the interior of the inorganic solid-state material.

In the surface structures described above, there may be regions in which a plurality of protuberances are densely concentrated and which have an average width of 50 nm to 530 nm.

The surface structures described above can be formed by irradiation with a gas cluster ion beam.

A chipping-proof edge tool according to the present invention has a cutting part made of any of the chipping-proof nonmetal inorganic solid-state materials described above. Furthermore, a chipping-proof edge tool according to the present invention is an edge tool made of a chipping-proof nonmetal inorganic solid-state material, wherein a cutting part of the edge tool has, on a surface thereof, a surface structure in which a network of recesses and protuberances surrounded by the recesses are formed, the protuberances have an average width of 5 nm to 50 nm, a physical property of the surface structure differs from the physical property of an interior of the inorganic solid-state material lying below the surface structure, and there is no solid-solid interface between the surface structure and the interior of the inorganic solid-state material.

Effects of the Invention

According to the present invention, the inorganic solid-state material has, in at least a part of the surface thereof, a surface structure in which a network of recesses and protuberances surrounded by the recesses are formed and which has a physical property different from that of the interior of the inorganic solid-state material. Therefore, when a force or impact is applied to the inorganic solid-state material, the surface structure alleviates stress concentration, so that a cracking or chipping is unlikely to occur.

BRIEF DESCRIPTION OF THE DRAWINGS

FIG. 10 is a table 1 showing sliding test results (for hardness ratio) in examples and comparative examples;

FIG. 12 is a table 2 (for hardness ratio) showing sliding test results in examples and comparative examples;

FIG. 14 is a table 3 (for hardness ratio) showing sliding test results in examples and comparative examples;

FIG. 16 is a table 1 (for Young's modulus ratio) showing sliding test results in examples and comparative examples;

FIG. 18 is a table 2 (for Young's modulus ratio) showing sliding test results in examples and comparative examples;

FIG. 20 is a table 3 (for Young's modulus ratio) showing sliding test results in examples and comparative examples;

FIG. 22 is a table 1 (for density ratio) showing sliding test results in examples and comparative examples;

FIG. 24 is a table 2 (for density ratio) showing sliding test results in examples and comparative examples;

FIG. 26 is a table 3 (for density ratio) showing sliding test results in examples and comparative examples;

FIG. 28 is a table 1 (for crystallization ratio) showing sliding test results in examples and comparative examples;

FIG. 30 is a table 2 (for crystallization ratio) showing sliding test results in examples and comparative examples;

FIG. 32 is a table 3 (for crystallization ratio) showing sliding test results in examples and comparative examples;

DETAILED DESCRIPTION OF THE EMBODIMENTS

Figure 1:
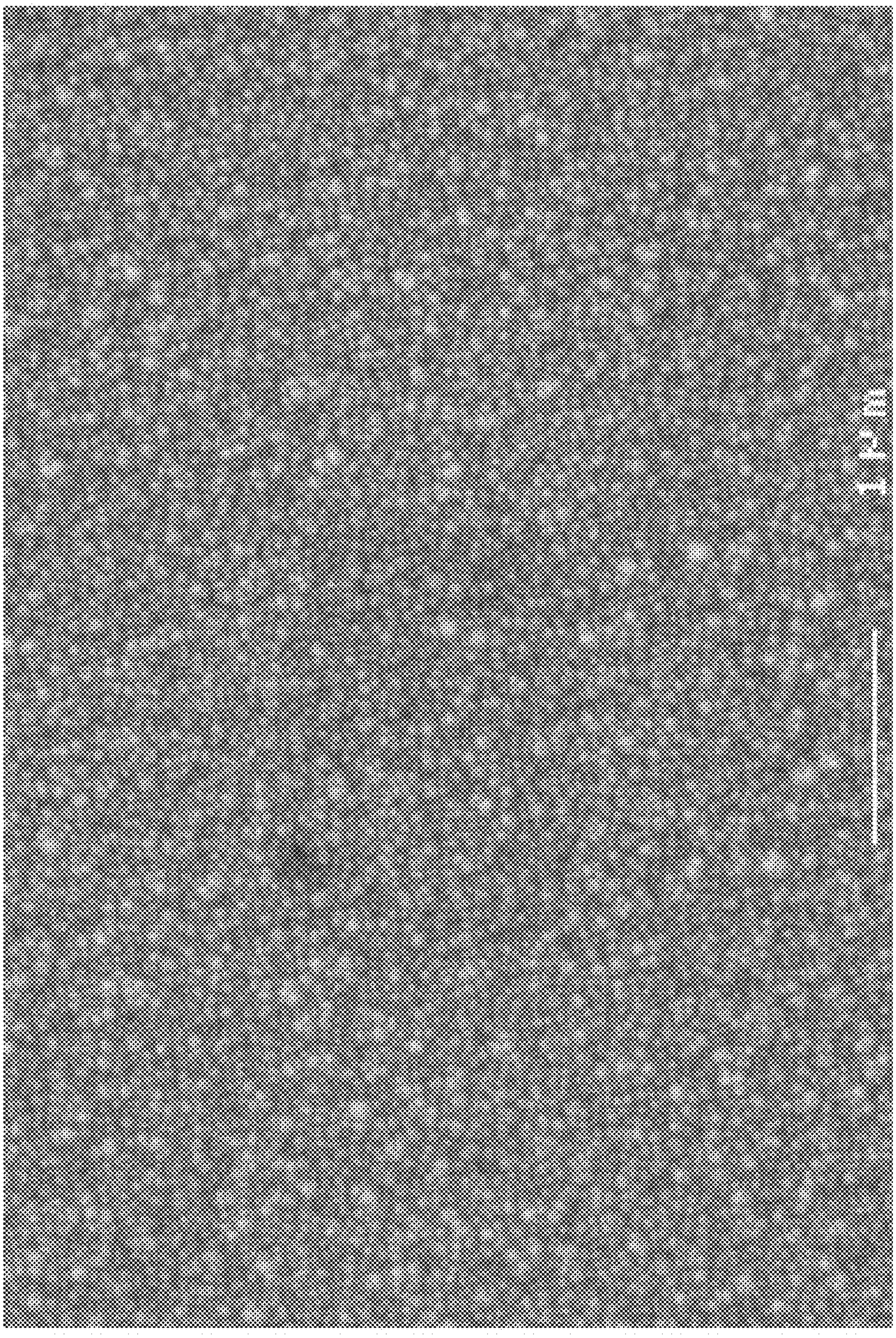
FIG. 1 shows an analysis image of a surface structure according to an example (containing no dense region) taken with a scanning electron microscope.

As described above, a nonmetal inorganic solid-state material cracks or chips because a stress is concentrated on a scratch on a surface of the inorganic solid-state material. Therefore, it has been conventionally believed that the hardness of the inorganic solid-state material can be improved by removing scratches or microcracks on the surface of the inorganic solid-state material.

However, the inventors have found that the hardness of the inorganic solid-state can be improved by forming a "scratch" having a certain characteristic on the surface of the inorganic solid-state material, rather than by removing scratches or microcracks on the surface of the inorganic solid-state material or, in other words, improving the surface flatness of the inorganic solid-state material.

Specifically, an inorganic solid-state material according to the present invention has, in at least a part of a surface thereof, a surface structure in which a network of recesses and protuberances surrounded by the recesses are formed. The average value of the widths (average width) of the protuberances is equal to or greater than 5 nm and equal to or smaller than 50 nm, a physical property of the surface structure differs from that of the interior of the inorganic solid-state material lying below the surface structure, and there is no solid-solid interface between the surface structure and the interior of the inorganic solid-state material. The term "solid-solid interface" is defined herein as a boundary at which a physical property discontinuously changes in a region between the surface structure and the interior of the inorganic solid-state material.

To be specific, for example, the above description "a physical property of the surface structure differs from that of the interior of the inorganic solid-state material lying below the surface structure, and there is no solid-solid interface between the surface structure and the interior of the inorganic solid-state material" means that "the Young's modulus of the surface structure is smaller than that of the interior of the inorganic solid-state material lying below the surface structure, and the Young's modulus in the boundary region between the interior of the inorganic solid-state material and the surface structure gradually changes as it goes from the interior of the inorganic solid-state material to the surface structure", "the density of the surface structure is smaller than that of the interior of the inorganic solid-state material lying below the surface structure, and the density in the boundary region between the interior of the inorganic solid-state material and the surface structure gradually changes as it goes from the interior of the inorganic solid-state material to the surface structure", "the hardness of the surface structure is smaller than that of the interior of the inorganic solid-state material lying below the surface structure, and the hardness in the boundary region between the interior of the inorganic solid-state material and the surface structure gradually changes as it goes from the interior of the inorganic solid-state material to the surface structure", or "the surface structure has an amorphous structure, the interior of the inorganic solid-state material lying below the surface structure has a crystalline structure, and the structure of the boundary region between the interior of the inorganic solid-state material and the surface structure gradually changes from the crystalline structure to the amorphous structure as it goes from the interior of the inorganic solid-state material to the surface structure (that is, the crystallization ratio of the surface structure is smaller than that of the interior of the inorganic solid-state material)".

In such a surface structure, there can be a region in which a plurality of (several to a hundred or so) protuberances is densely concentrated. The region is referred to as a dense region, hereinafter. The average value of the widths (average width) of such dense regions is preferably equal to or greater than 50 nm and equal to or smaller than 530 nm. In the case where the average width of the dense regions is 50 nm, the dense region is formed by protuberances having an average width smaller than 50 nm.

The nonmetal inorganic solid-state material is an insulator or a semiconductor, for example, and has a brittleness. Specific examples of the nonmetal inorganic solid-state material include diamond, cubic boron nitride (cBN), a tungsten carbide sintered body (referred to also as a cemented carbide), glass, silicon, and various kinds of ceramics. The inorganic solid-state material can have any solid-state structure, such as a single-crystalline structure, a polycrystalline structure, a sintered body containing a metal binder and an amorphous structure. For example, diamond can be single-crystalline diamond, polycrystalline diamond containing a metal binder (referred to also as sintered diamond), and polycrystalline diamond that contains no metal binder, for example. The present invention does not completely exclude inorganic solid-state materials containing metal, and the effect of the present invention can be achieved if a main constituent has a brittleness in the solid state.

The inventors also have found that the surface structure described above can be formed on a surface of an inorganic solid-state material by irradiating the surface of the inorganic solid-state material with a gas cluster ion beam after adequately planarizing the surface by mechanical polishing or the like. The processing with the gas cluster ion beam is a beam process, so that the gas cluster ion beam can be focused on a part of a tool, such as a cutting part thereof.

As an apparatus that forms the surface structure described above on the surface of the inorganic solid-state material, a gas cluster ion beam apparatus described in Japanese Registered Patent No. 3994111 can be used for example. A raw material gas is injected into a vacuum cluster generation chamber through a nozzle, in which the gas molecules are aggregated to generate a cluster. The cluster is guided as a gas cluster beam into an ionization chamber through a skimmer. In the ionization chamber, an ionizer applies an electron beam, such as of thermoelectrons, to ionize the neutral cluster. The ionized gas cluster beam is accelerated by an acceleration electrode. The incident gas cluster ion beam is reduced by an aperture to a predetermined beam diameter and then applied to the surface of the inorganic solid-state material. The angle at which the surface of the inorganic solid-state material is irradiated with the gas cluster ion beam can be controlled by inclining the inorganic solid-state material. In addition, the inorganic solid-state material can be irradiated with the gas cluster ion beam in any direction by moving the inorganic solid-state material in the longitudinal direction or lateral direction by means of an XY stage or rotating the inorganic solid-state material by means of a rotating mechanism.

FIGS. 1 to 6 show examples of analysis images (SEM images) of the surface structure described above taken with a scanning electron microscope (SEM).

Figure 2:
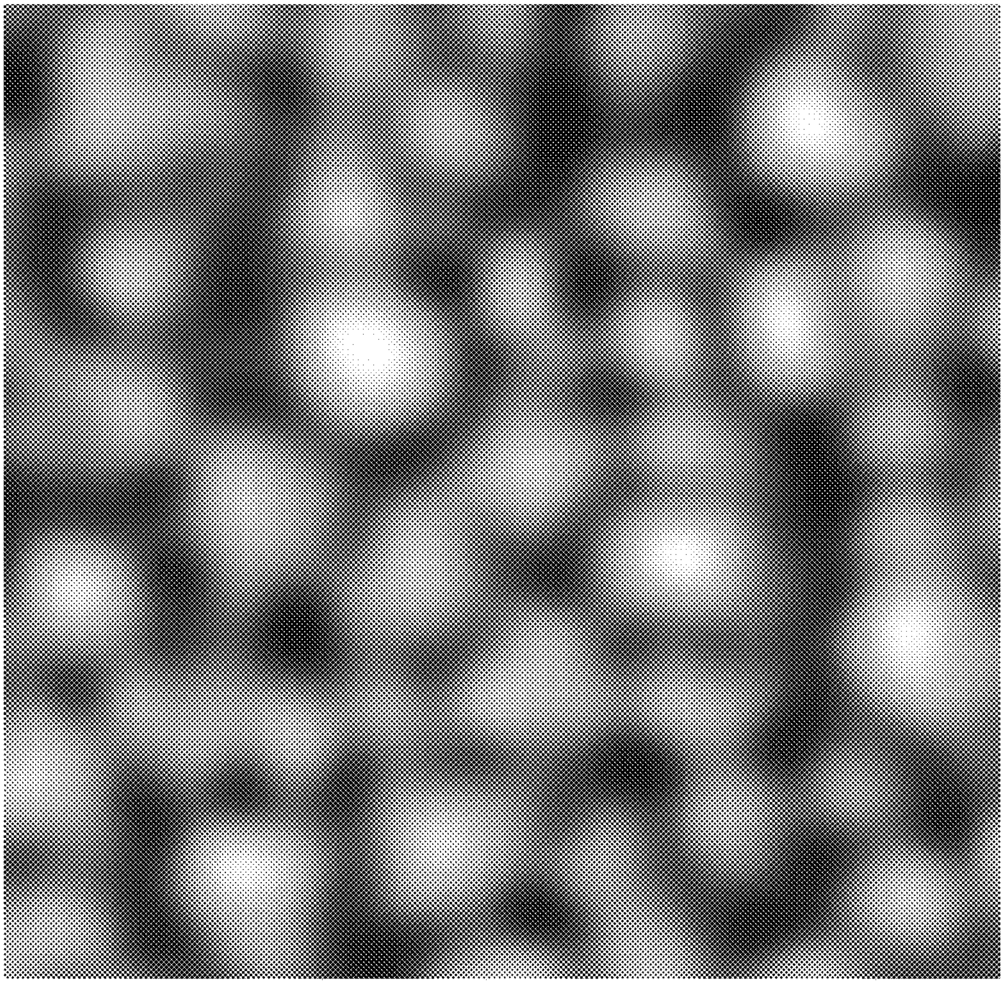
FIG. 2 shows an enlarged analysis image (200 nm×200 nm) of a part of the surface structure shown in FIG. 1.
Figure 3:
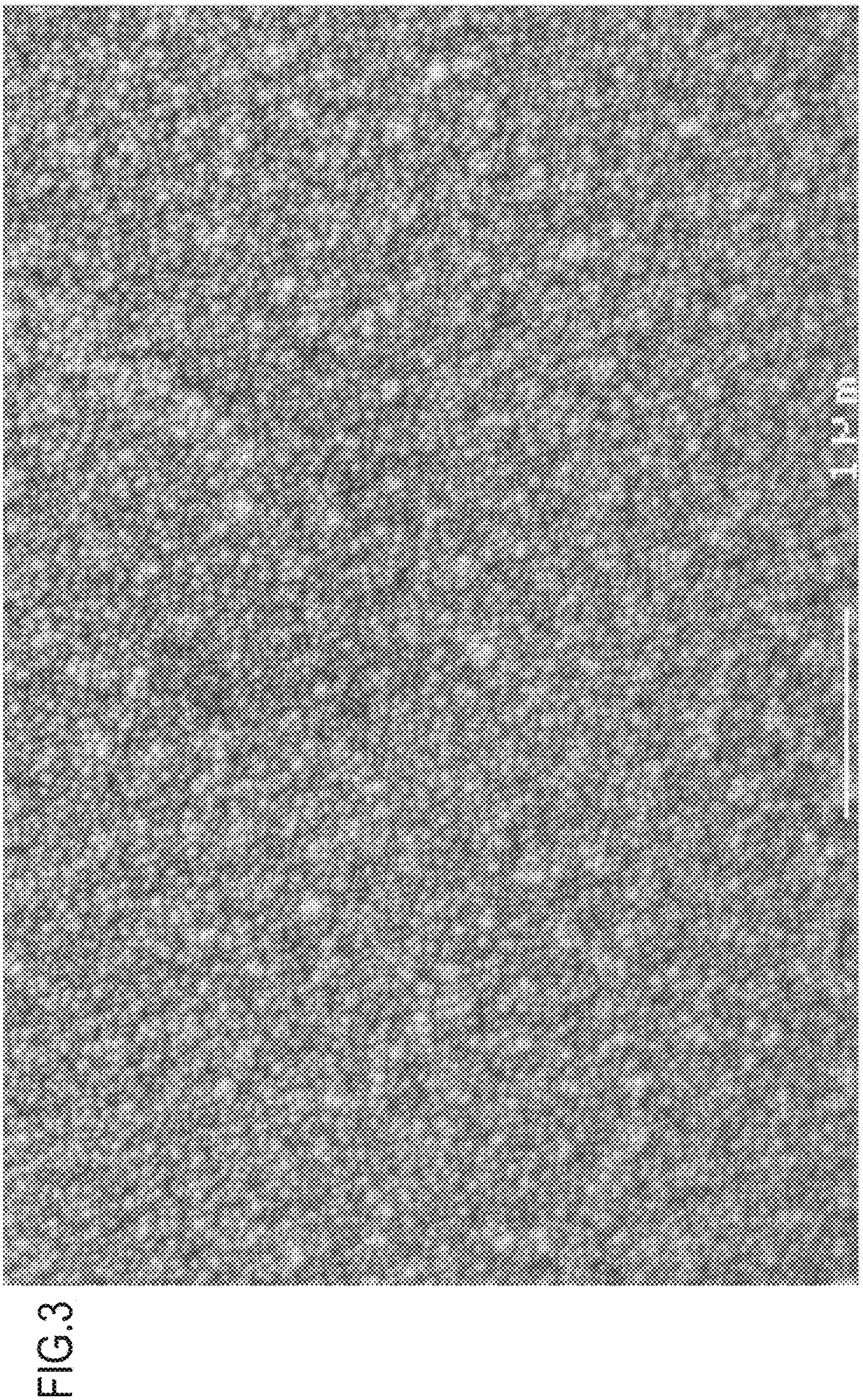
FIG. 3 shows an analysis image of a surface structure according to an example (containing no dense region) taken with the scanning electron microscope.
Figure 4:
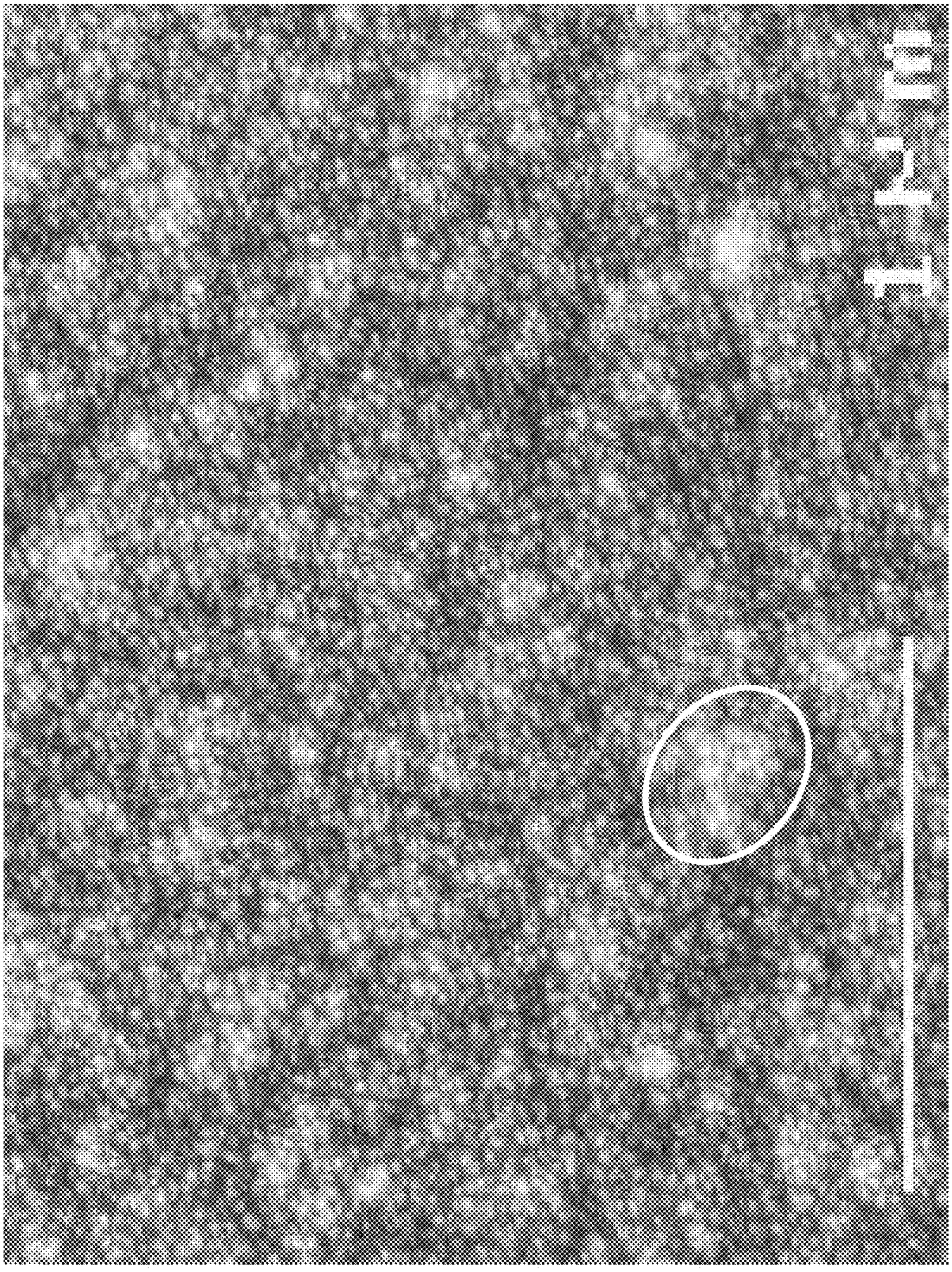
FIG. 4 shows an analysis image of a surface structure according to an example (containing a dense region) taken with the scanning electron microscope.
Figure 5:
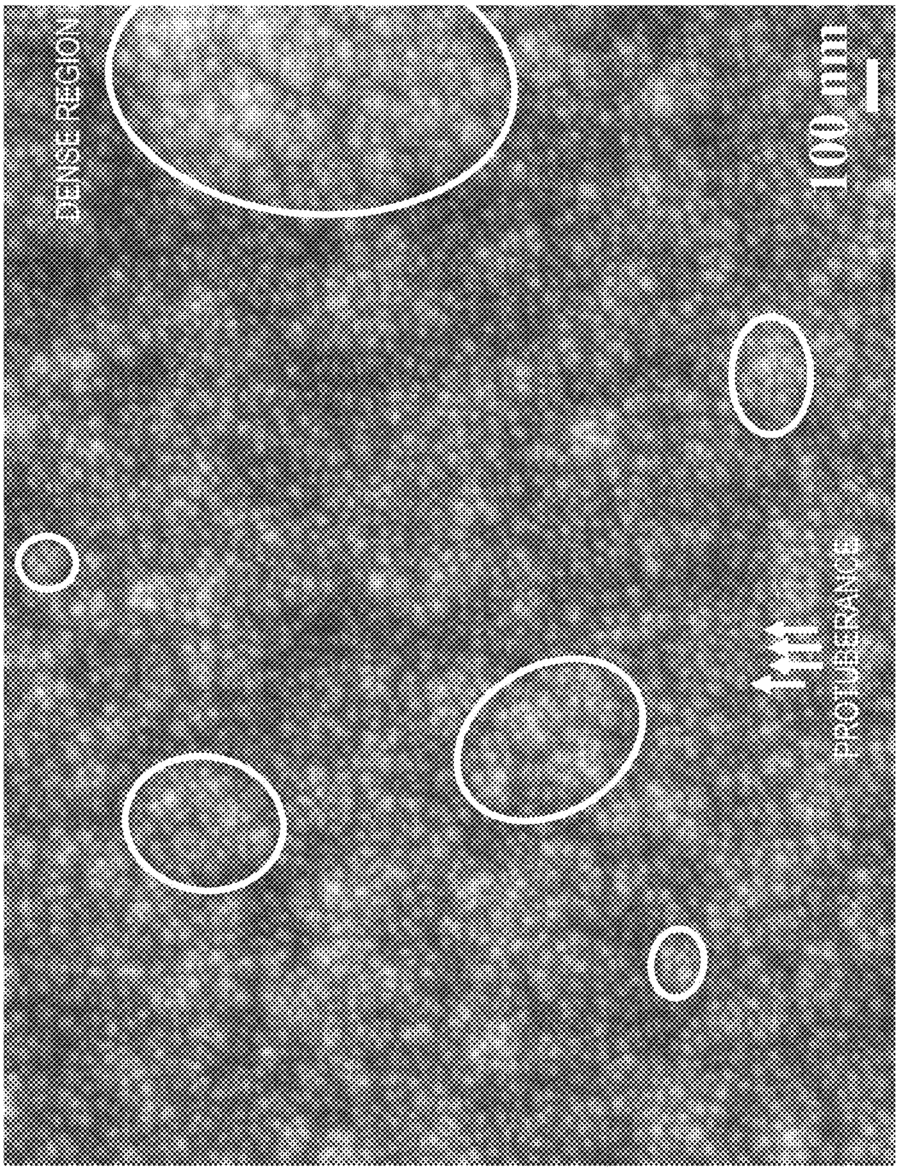
FIG. 5 shows an analysis image of a surface structure according to an example (containing dense regions) taken with the scanning electron microscope.

In FIGS. 1 to 4, what appear like white dots are protuberances, and what appears like a black network surrounding the white dots is a recess (in the SEM image, higher parts appear more white, and lower parts appear more black). In the surface structures shown in FIGS. 1 and 3, protuberances substantially uniformly exist. FIG. 2 shows an analysis image (200 nm×200 nm) that shows an enlarged view of a part of the surface structure shown in FIG. 1. In the surface structures shown in FIGS. 4 and 5, protuberances nonuniformly exist, and it can be seen that there is a dense region in which a plurality of protuberances are densely concentrated. In FIGS. 4 and 5, some of a plurality of dense regions are shown in circles, and protuberances are indicated by arrows.

Figure 6:
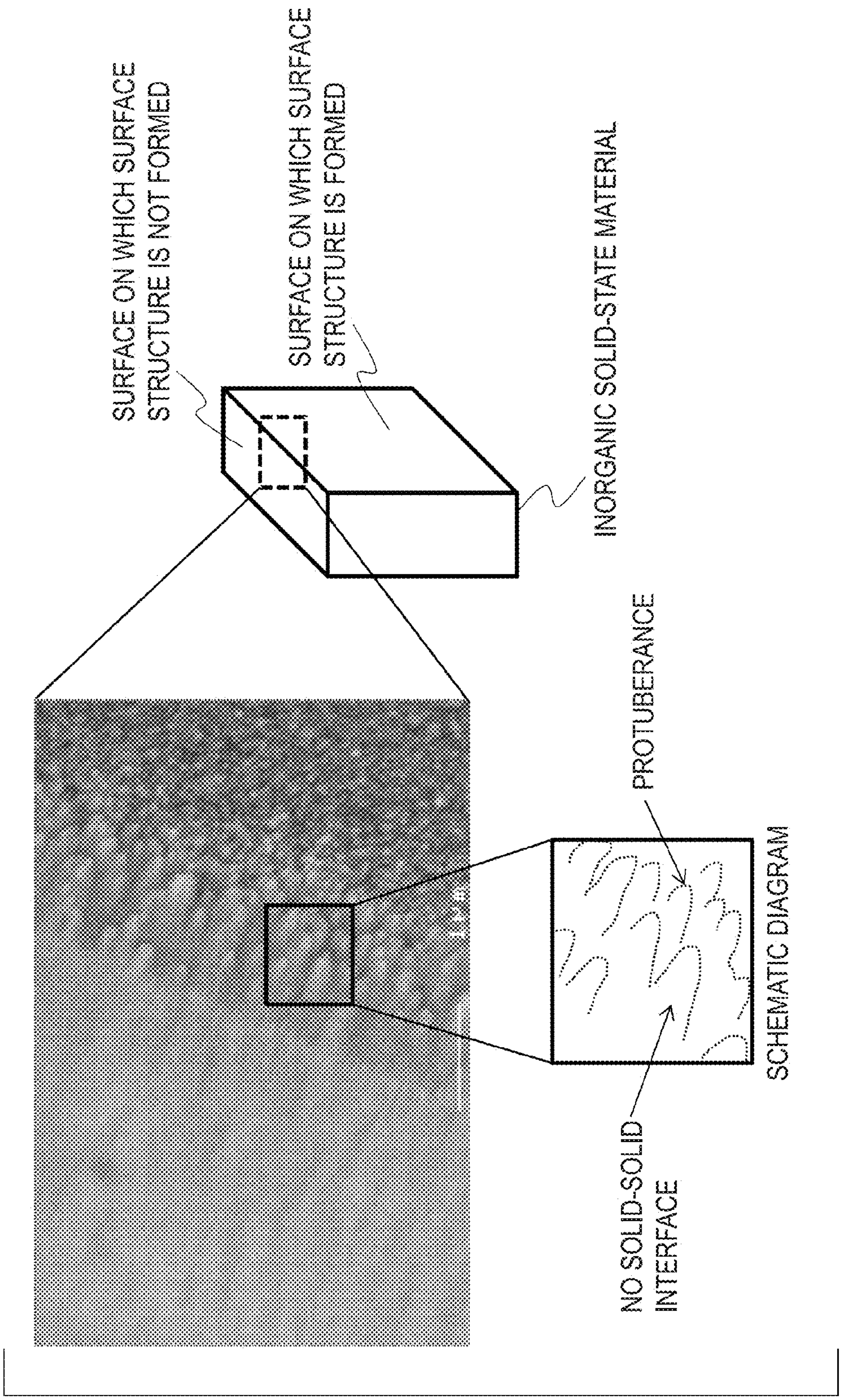
FIG. 6 shows an analysis image of a surface structure according to an example taken with the scanning electron microscope.

FIG. 6 shows an SEM image of an edge part of an inorganic solid-state material in the case where the surface structure described above is formed on one of the two faces forming the edge part and is not formed on the other. As can be seen from the SEM image, the protuberances have projection-like, tower-like, mountain-like or other three-dimensional shapes. As can be further seen from the SEM image shown in FIG. 6 and the schematic diagram of the SEM image, there is no obvious solid-solid interface in the boundary region between the interior of the inorganic solid-state material and the surface structure (in particular, individual protuberances).

Figure 7:
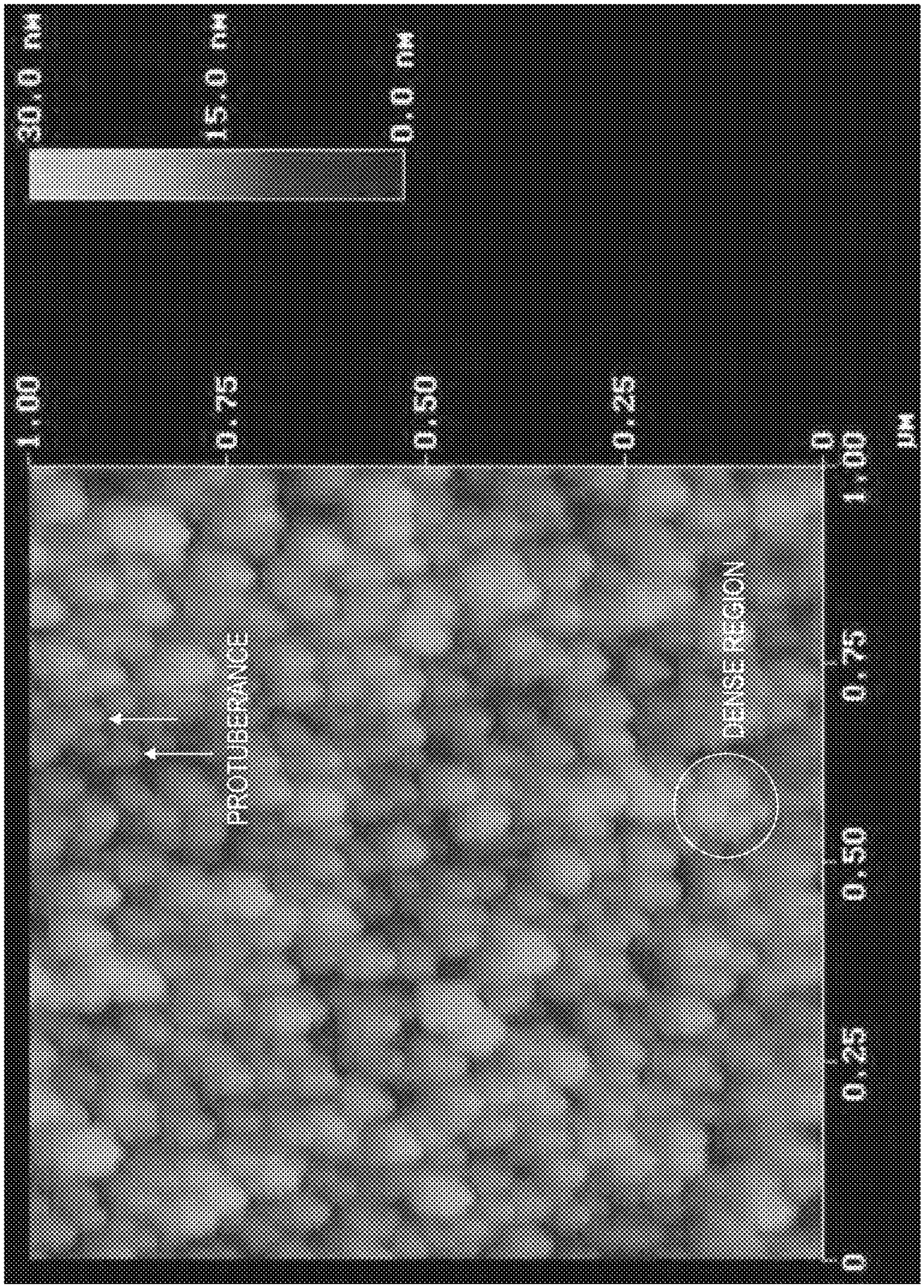
FIG. 7 shows an analysis image of the surface structure according to the example taken with an atomic force microscope.

FIG. 7 shows an example of an analysis image (AFM image) of the surface structure described above taken with an atomic force microscope (AFM). As can be seen from FIGS. 4, 5 and 7, dense regions are higher than single protuberances.

A possible mechanism of formation of the surface structure described above on the surface of an inorganic solid-state material adequately planarized by mechanical polishing or the like by irradiation of the surface with a gas cluster ion beam is as follows.

Figure 8:
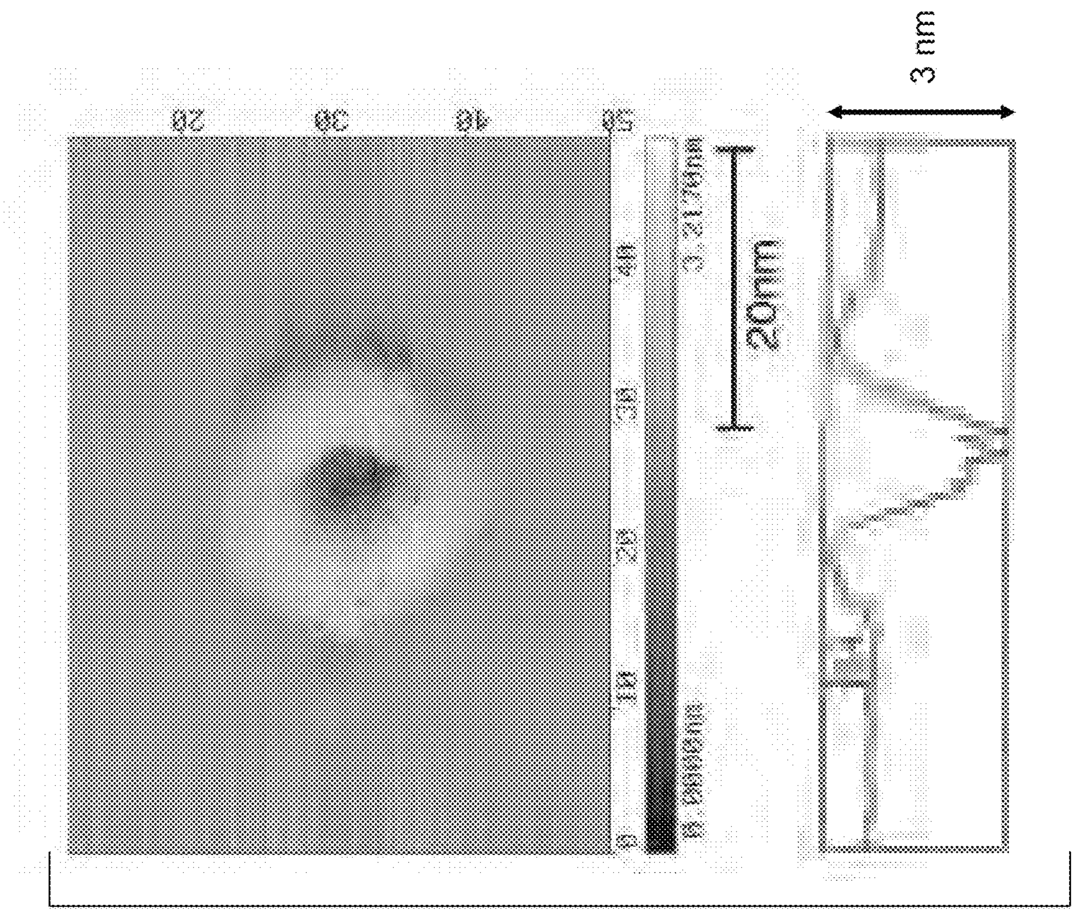
FIG. 8 shows a structure of a crater formed by collision of a cluster.

When a cluster collides with the flat surface of the inorganic solid-state material, a crater is formed on the surface of the inorganic solid-state material (regardless of the kind of the inorganic solid-state material). Provided that the height of the flat surface of the inorganic solid-state material yet to be irradiated with the gas cluster ion beam is a reference level, the central part of the crater is lower than the reference level, and the part of the crater around the point of collision of the cluster forms an annular ridge higher than the reference level come of the swell of the inorganic solid-state material (see FIG. 8, which is cited from "Basic and Application of Cluster Ion Beam", written and edited by Isao Yamada, Nikkan Kogyo Shimbun, 2006, p. 70). If the inorganic solid-state material adequately planarized by mechanical polishing or the like is irradiated with the gas cluster ion beam, a large number of clusters collide with the surface of the inorganic solid-state material to form a large number of craters on the surface of the inorganic solid-state material. In the course of the process, clusters land at craters formed earlier or vicinities thereof, so that a single crater is very unlikely to maintain the original shape. As a result of such successive crater formations, the central parts of a large number of craters aggregate to form a network of recesses, and protuberances (which are the remains of the ridges) surrounded by the recesses are formed.

In the process of successive crater formations, formations of new craters and destructions of craters formed earlier occur at the same time. If the frequency of crater formations and the frequency of crater destructions balance with each other, a surface structure in which protuberances substantially uniformly exist as shown in FIGS. 1 and 3 (a surface structure in which no dense region exist) is formed. On the other hand, if the frequency of crater formations and the frequency of crater destructions is unbalanced, in particular, the frequency of crater formations is higher than the frequency of crater destructions, the central parts of the craters become even deeper, and the ridge parts become even higher, and a surface structure in which a dense region (a region in which protuberances are densely concentrated) exist as shown in FIGS. 4 and 5 is formed. In the case of the surface structure in which protuberances substantially uniformly exist, the average difference (in height) between the bottoms of the recesses and the tops of the protuberances is about several to several tens of nanometers. In the case of the surface structure in which a dense region exists, the difference (in height) between the bottoms of the recesses and the tops of the protuberances is greater than that in the case of the surface structure in which protuberances substantially uniformly exist because of the unbalance between the frequency of crater formations and the frequency of crater destructions.

Since all the protuberances do not always have the same size and shape, the "average width of the protuberances" described above is used as an indicator of the size of the protuberances. More specifically, in the front view of the surface of the inorganic solid-state material on which the surface structure described above is formed, the diameter of the smallest circle containing a single protuberance is determined for various protuberances, and the average value of the diameters is defined as the "average width of the protuberances." In addition, the number of the protuberances existing in a square of 1 μm by 1 μm is defined as the "density of protuberances."

Figure 9:
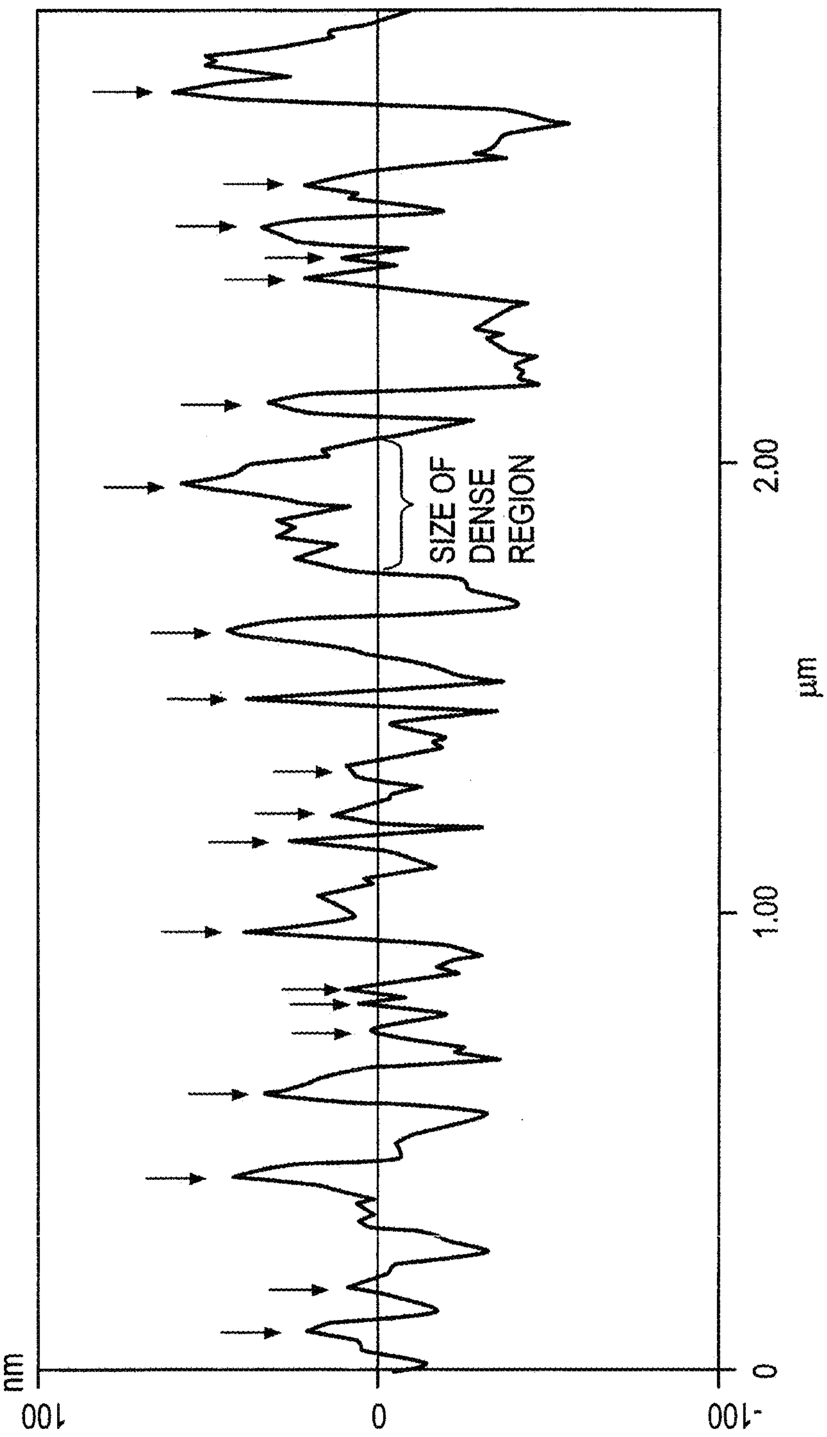
FIG. 9 is an example of a line profile for illustrating a definition of a width of the dense region.

Similarly, since all the dense regions do not always have the same size and shape, the "average width of the dense regions" described above is used as an indicator of the size of the dense regions. More specifically, provided that the width of a dense region is the length of the section of a mean line of the measured mean surface roughness of the surface structure between a point where the surface profile rises and intersects with the mean line and a point where the surface profile falls and intersects with the mean line the next time (see FIG. 9, in which there are 20 dense regions indicated by arrows), the widths of the dense regions observed along several mean lines are determined, and the average value of the widths is defined as the "average width of the dense regions". In addition, the number of the dense regions existing in a square of 1 μm by 1 μm is defined as the "density of dense regions." A reason why the average width of the dense regions is defined in this way is that, since the difference (in height) between the bottoms of the recesses and the tops of the protuberances is greater in the dense regions than in the other regions, the protuberances in the other regions are observed as projections lower than the mean line, and the dense regions are observed as projections higher than the mean line.

Examples and Comparative Examples

Examples of the present invention and comparative examples used for checking the effectiveness of the examples will be described (with reference to FIGS. 10 to 33). In the following description, the inorganic solid-state material will be referred to also as a sample. In the examples and the comparative examples, a sample that had a rectangular parallelepiped shape and had a length of 5 mm, a width of 1 mm and a height of 1 mm before processing and whose six surfaces had been planarized by mechanical polishing was used.

In the examples and comparative examples in which the surface of the sample was irradiated with the gas cluster ion beam ("GCIB" is entered in the "processing" field shown in FIG. 10, for example), each of three surfaces, one surface having a length of 5 mm and a width of 1 mm and two surfaces having a length of 5 mm and a height of 1 mm, was irradiated with the gas cluster ion beam in a direction normal to the irradiation target surface. In these examples and comparative examples, various surface structures having different average widths of the protuberances were formed on surfaces of various inorganic solid-state materials by controlling the conditions for generation of the gas cluster ion beam (such as the acceleration voltage, the amount of irradiation, the voltage or current of ionization electrons, the kind of the gas, the pressure of the gas, the exhaust rate of the process chamber). The average width of the protuberances and the average width of the dense regions of the surface structures of the various samples formed were calculated based on observation with a scanning electron microscope and an atomic force microscope. The density of the protuberances and the density of the dense regions were also counted according to the definitions described above.

In the comparative examples in which the surface of the sample was not irradiated with the gas cluster ion beam, either of two kinds of processings was used.

A first processing was "patterning" as shown in the "processing" field in FIG. 10, for example, in which a rectangular pattern structure (a surface structure in which a cyclic sequence of recesses and projections is formed on the surface in two perpendicular directions) was formed on a surface of a sample by dry etching with a resist mask formed by patterning by lithography. The definitions of the size and the density of the projections in the rectangular pattern formed in this way are the same as those of the protuberances described above (in the definitions concerning the protuberances, the term "protuberance" should be replaced with the term "projection"). In the drawings (see FIG. 10, for example), for the sake of convenience, the numerical values of the size (average width) and the density of the projections are shown in the "size of protuberance" field and the "density of protuberances" field, respectively.

A second processing was "deposition" as shown in the "processing" field in FIG. 10, for example, in which a large number of granular deposits (diamond-like carbon) were formed by deposition on a surface of a sample. The definitions of the size and the density of the granular deposits formed in this way are the same as those of the protuberances described above (in the definitions concerning the protuberances, the term "protuberance" should be replaced with the term "granular deposit"). In the drawings (see FIG. 10, for example), for the sake of convenience, the numerical values of the size (average width) and the density of the granular deposits are shown in the "size of protuberance" field and the "density of protuberances" field, respectively.

In some comparative examples, a sample that was not processed (a sample just subjected to surface planarization by mechanical polishing) was used. As shown in FIG. 10, for example, a symbol "-" is shown in the "processing" field of these comparative examples.

Each sample was examined for a variation in strength by sliding test. The sample was placed on a sliding tester with the surface having a length of 5 mm and a width of 1 mm irradiated with the gas cluster ion beam facing up, and the sliding test was conducted using a wedge-shaped indenter made of cemented carbide having a 1-mm long edge. The wedge-shaped indenter was placed with the longitudinal direction of the edge parallel with the 5-mm side of the sample and moved back and forth 100 times in parallel with the 1-mm side of the sample under a load of 100 grams-force at a speed of 60 cpm. The sliding distance was slightly larger than 1 mm, so that the wedge-shaped indenter moved beyond the right-angle corners on the opposite sides of the sample. Stress concentration tends to take place at the right-angle corners on the opposite sides of the sample, i.e. in the vicinity of the edges of the solid-state material, and therefore the right-angle corners are better suited for observation of a variation in strength (i.e., tendency of the chipping occurrence). The right-angle corners on the opposite sides were checked for a chipping, and the chipping occurrence rate was calculated. The chipping occurrence rate was calculated as follows. The length of the part of each right-angle corner of the sample in contact with the wedge-shaped indenter was 1 mm, which was the length of the wedge-shaped indenter. The part was divided into 100 sections having a length of 10 μm. If a chipping of 0.1 μm or larger occurred in a section, it was determined that there was a chipping in the section. Otherwise, it was determined that there was no chipping. 100 sections were randomly selected from the total of 200 sections of the right-angle corners on the opposite sides of the sample, and the percentage of the number of the sections that were determined to have a chipping in the 100 sections was the chipping occurrence rate.

As physical properties serving as an indicator of the variation in strength, hardness, Young's modulus, density and crystallization ratio were used.

Case where Hardness was Used as Indicator

The hardness of each sample was measured with a thin film hardness meter. The hardness of the surface of the sample yet to be irradiated with the gas cluster ion beam was regarded as the hardness of the interior of the sample (referred to as an internal hardness hereinafter). The ratio of the hardness of the surface of the sample irradiated with the gas cluster ion beam to the internal hardness was determined as the hardness ratio.

Case where Young's Modulus was Used as Indicator

The Young's modulus of each sample was measured with an ultrathin film Young's modulus measuring system using a surface acoustic wave method. The Young's modulus of the surface of the sample yet to be irradiated with the gas cluster ion beam was regarded as the Young's modulus of the interior of the sample (referred to as an internal Young's modulus hereinafter). The ratio of the Young's modulus of the surface of the sample irradiated with the gas cluster ion beam to the internal Young's modulus was determined as the Young's modulus ratio.

Case where Density was Used as Indicator

The density of each sample was measured with a thin film density meter. The density of the surface of the sample yet to be irradiated with the gas cluster ion beam was regarded as the density of the interior of the sample (referred to as an internal density hereinafter). The ratio of the density of the surface of the sample irradiated with the gas cluster ion beam to the internal density was determined as the density ratio.

Case where Crystallization Ratio was Used as Indicator

The spot intensity of the electron diffraction image (diffraction spot intensity) of each sample was measured. The diffraction spot intensity of the surface of the sample yet to be irradiated with the gas cluster ion beam was regarded as the diffraction spot intensity of the interior of the sample (referred to as an internal diffraction spot intensity hereinafter). The ratio of the diffraction spot intensity of the surface of the sample irradiated with the gas cluster ion beam to the internal diffraction spot intensity was determined as the crystallization ratio. If the crystallization ratio is lower than 100%, the surface structure has an amorphous structure.

Hardness Ratio: FIGS. 10 to 15

Examples 1 to 27

Samples in examples 1 to 27 had various surface structures on their surfaces formed with the gas cluster ion beam. The samples in the examples 1 to 9 were made of single-crystal diamond, the samples in the examples 10 to 18 were made of sintered diamond, and the samples in the examples 19 to 27 were made of binderless cBN.

In the examples 1 to 27, the hardness ratio was lower than that of the sample yet to be irradiated with the gas cluster ion beam. In the examples 1 to 27, the average width of the protuberances was equal to or greater than 5 nm and equal to or smaller than 50 nm, and the chipping occurrence rate was equal to or lower than 28%. In particular, if there were dense regions (regions in which a plurality of protuberances were densely concentrated) having an average width of about 50 nm to 530 nm, the chipping occurrence rate was 0% (the examples 6 to 9, 15 to 18 and 24 to 27).

Comparative Examples 1, 8 and 15

The chipping occurrence rate of each sample whose surface had been planarized by mechanical polishing was 100%.

Comparative Examples 2, 9 and 16

The chipping occurrence rate in the case where the average width of the protuberances was 3 nm was 89 to 95%.

Comparative Examples 6, 13 and 20

The hardness ratio of each sample having the rectangular pattern structure (the average width of the projections was 50 nm) as the surface structure did not differ between before and after dry etching (the hardness ratio was 100%), and the chipping occurrence rate of each sample was 100%.

Comparative Examples 7, 14 and 21

The hardness ratio of each sample having the granular deposits as the surface structure decreased, but the chipping occurrence rate of each sample was 100%.

Comparative Examples 3 to 5, 10 to 12 and 17 to 19

Samples in the comparative examples 3 to 5, 10 to 12 and 17 to 19 had various surface structures on their surfaces formed with the gas cluster ion beam. The samples in the comparative examples 3 to 5 were made of single-crystal diamond, the samples in the comparative examples 10 to 12 were made of sintered diamond, and the samples in the comparative examples 17 to 19 were made of binderless cBN.

In these comparative examples, the hardness ratio was lower than that of the sample yet to be irradiated with the gas cluster ion beam, but the average width of the protuberances was greater than 50 nm, and the chipping occurrence rate was equal to or higher than 50%.

Figure 11:
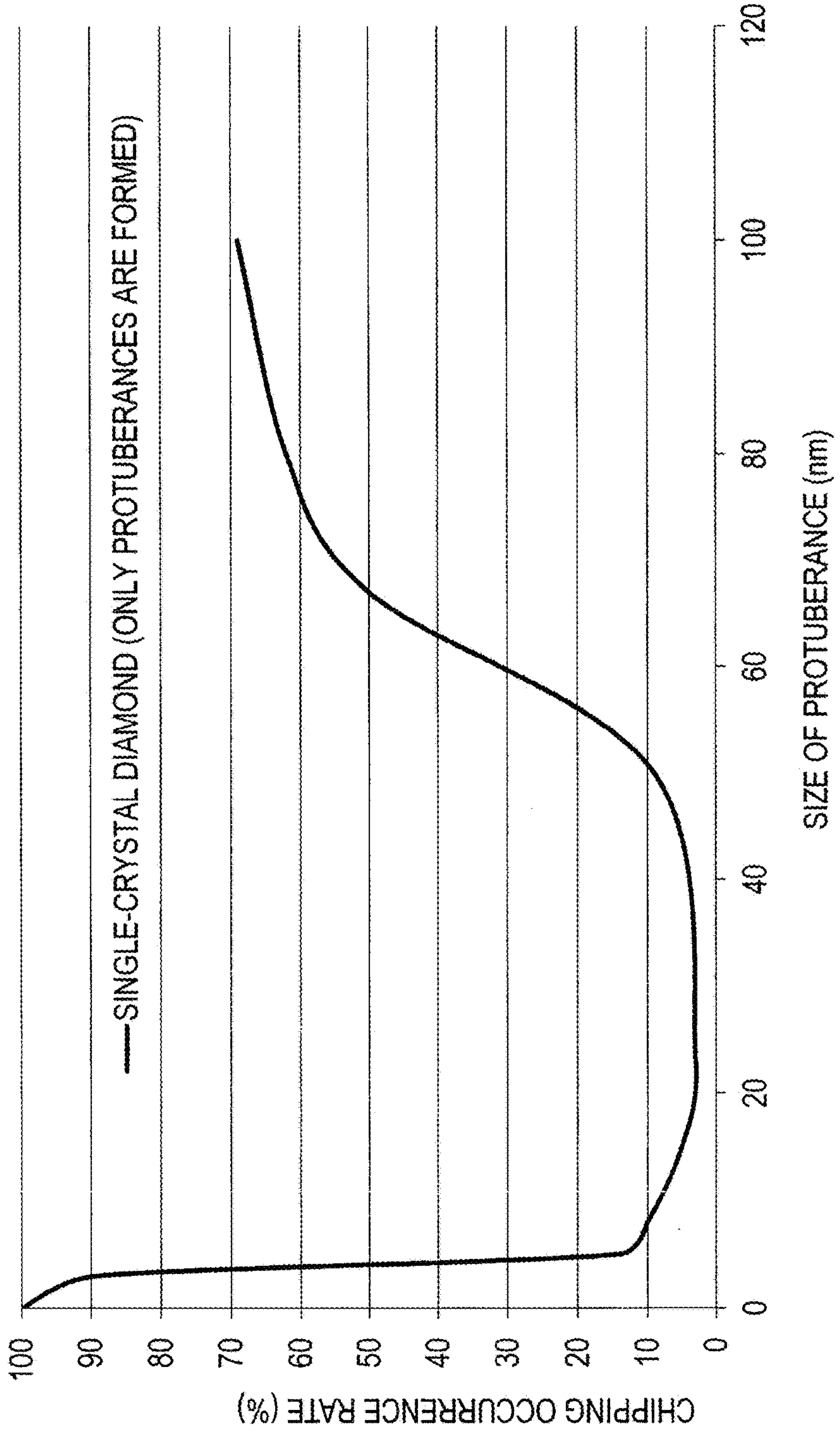
FIG. 11 is a graph showing a relationship between the size of protuberances and the chipping occurrence rate in a total of 10 examples, specifically, examples 1 to 5 and comparative examples 1 to 5.
Figure 13:
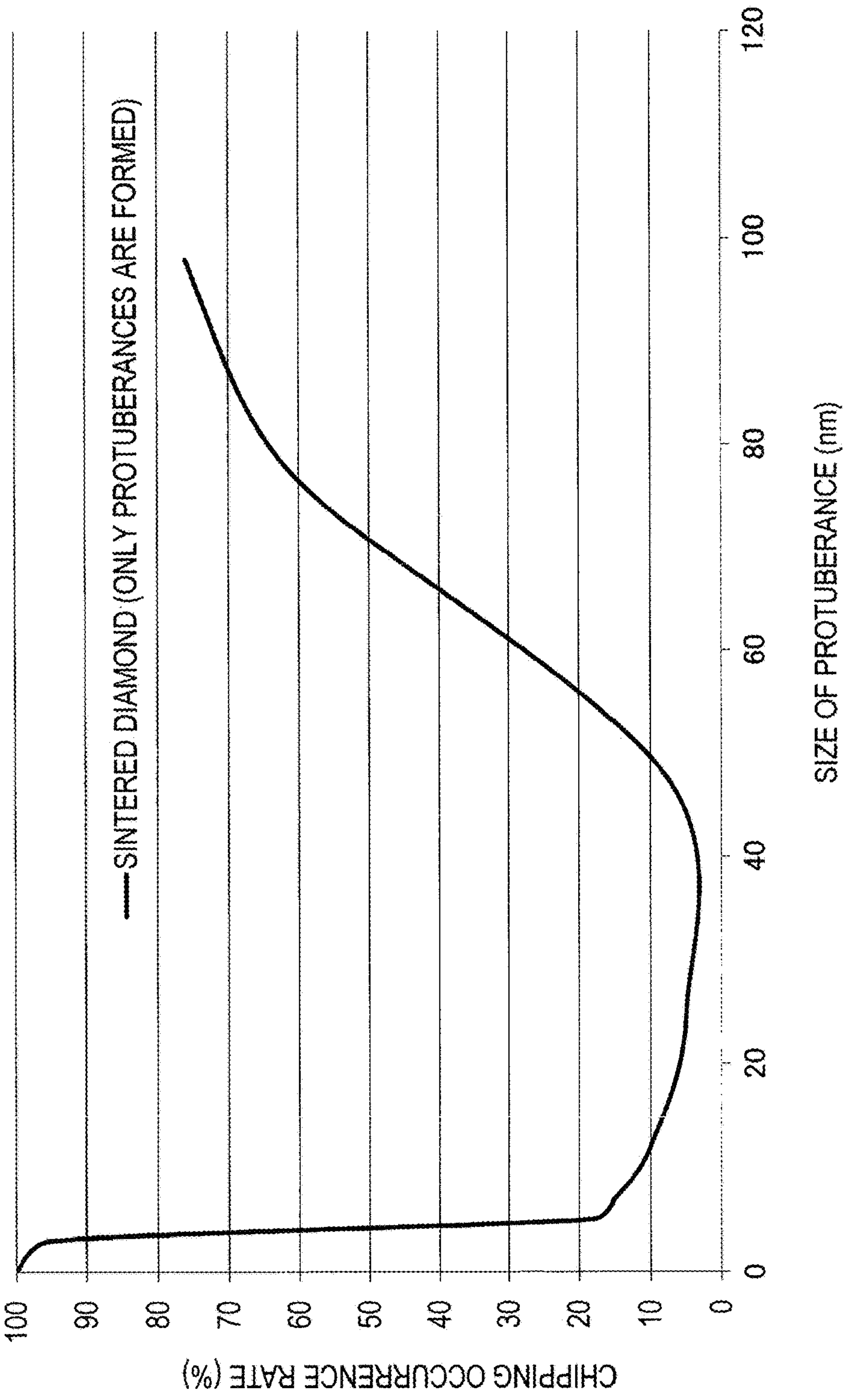
FIG. 13 is a graph showing a relationship between the size of protuberances and the chipping occurrence rate in a total of 10 examples, specifically, examples 10 to 14 and comparative examples 8 to 12.
Figure 15:
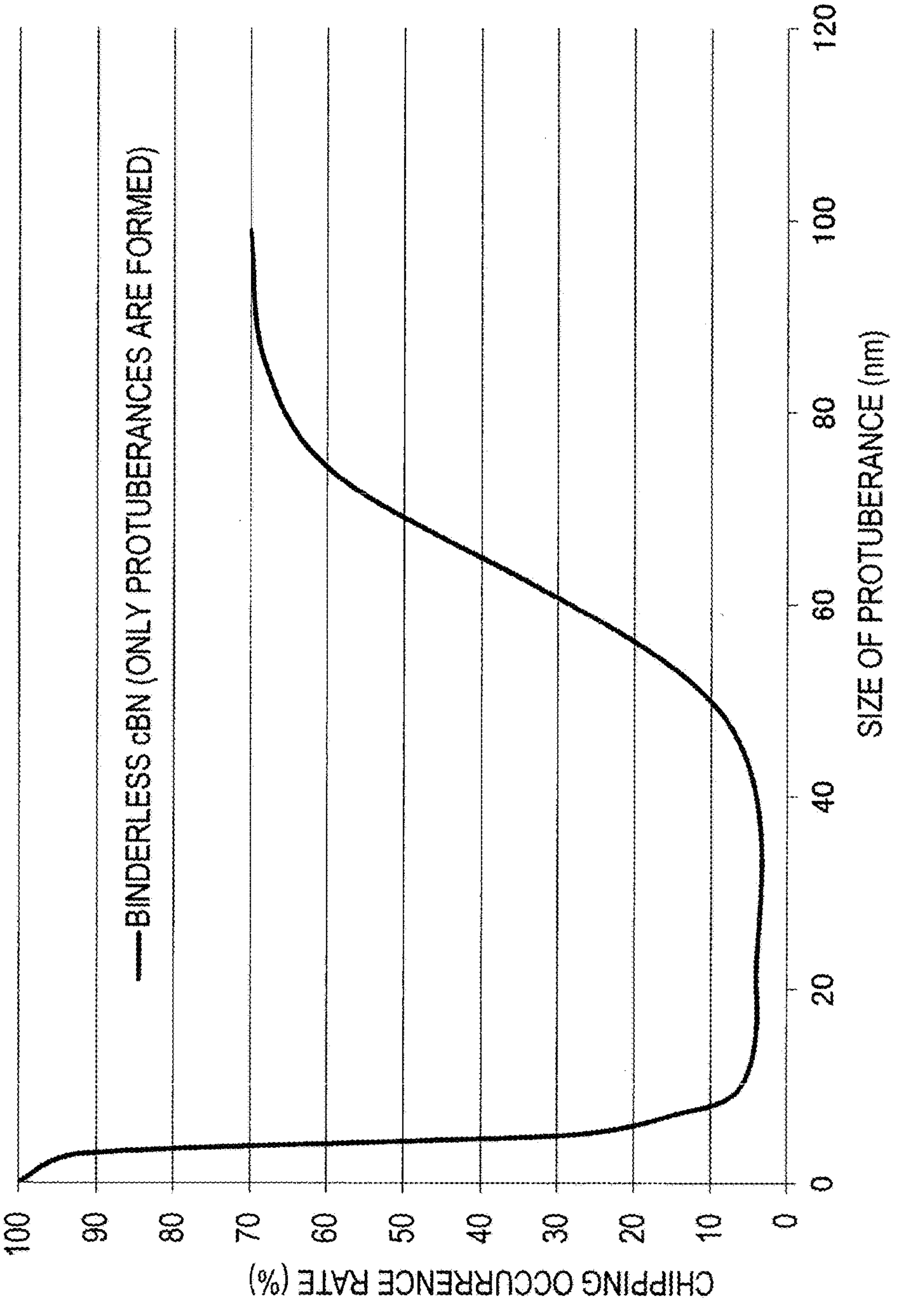
FIG. 15 is a graph showing a relationship between the size of protuberances and the chipping occurrence rate in a total of 10 examples, specifically, examples 19 to 23 and comparative examples 15 to 19.

FIG. 11 shows a relationship between the size of the protuberances and the chipping occurrence rate in a total of 10 examples, specifically, the examples 1 to 5 and the comparative examples 1 to 5. FIG. 13 shows a relationship between the size of the protuberances and the chipping occurrence rate in a total of 10 examples, specifically, the examples 10 to 14 and the comparative examples 8 to 12. FIG. 15 shows a relationship between the size of the protuberances and the chipping occurrence rate in a total of 10 examples, specifically, the examples 19 to 23 and the comparative examples 15 to 19.

Young's Modulus Ratio: FIGS. 16 to 21

Examples 28 to 54

Samples in examples 28 to 54 had various surface structures on their surfaces formed with the gas cluster ion beam. The samples in the examples 28 to 36 were made of single-crystal diamond, the samples in the examples 37 to 45 were made of sintered diamond, and the samples in the examples 46 to 54 were made of binderless cBN.

In the examples 28 to 54, the hardness ratio was lower than that of the sample yet to be irradiated with the gas cluster ion beam. In the examples 28 to 54, the average width of the protuberances was equal to or greater than 5 nm and equal to or smaller than 50 nm, and the chipping occurrence rate was equal to or lower than 31%. In particular, if there were dense regions (regions in which a plurality of protuberances were densely concentrated) having an average width of about 50 nm to 530 nm, the chipping occurrence rate was 0% (the examples 33 to 36, 42 to 45 and 51 to 54).

Comparative Examples 22, 29 and 36

The chipping occurrence rate of each sample whose surface had been planarized by mechanical polishing was 100%.

Comparative Examples 23, 30 and 37

The chipping occurrence rate in the case where the average width of the protuberances was 3 nm was 91 to 96%.

Comparative Examples 27, 34 and 41

The Young's modulus ratio of each sample having the rectangular pattern structure (the average width of the projections was 50 nm) as the surface structure did not differ between before and after dry etching (the Young's modulus ratio was 100%), and the chipping occurrence rate of each sample was 100%.

Comparative Examples 28, 35 and 42

The Young's modulus ratio of each sample having the granular deposits as the surface structure decreased, but the chipping occurrence rate of each sample was 100%.

Comparative Examples 24 to 26, 31 to 33 and 38 to 40

Samples in the comparative examples 24 to 26, 31 to 33 and 38 to 40 had various surface structures on their surfaces formed with the gas cluster ion beam. The samples in the comparative examples 24 to 26 were made of single-crystal diamond, the samples in the comparative examples 31 to 33 were made of sintered diamond, and the samples in the comparative examples 38 to 40 were made of binderless cBN.

In these comparative examples, the Young's modulus ratio was lower than that of the sample yet to be irradiated with the gas cluster ion beam, but the average width of the protuberances was greater than 50 nm, and the chipping occurrence rate was equal to or higher than 50%.

Figure 17:
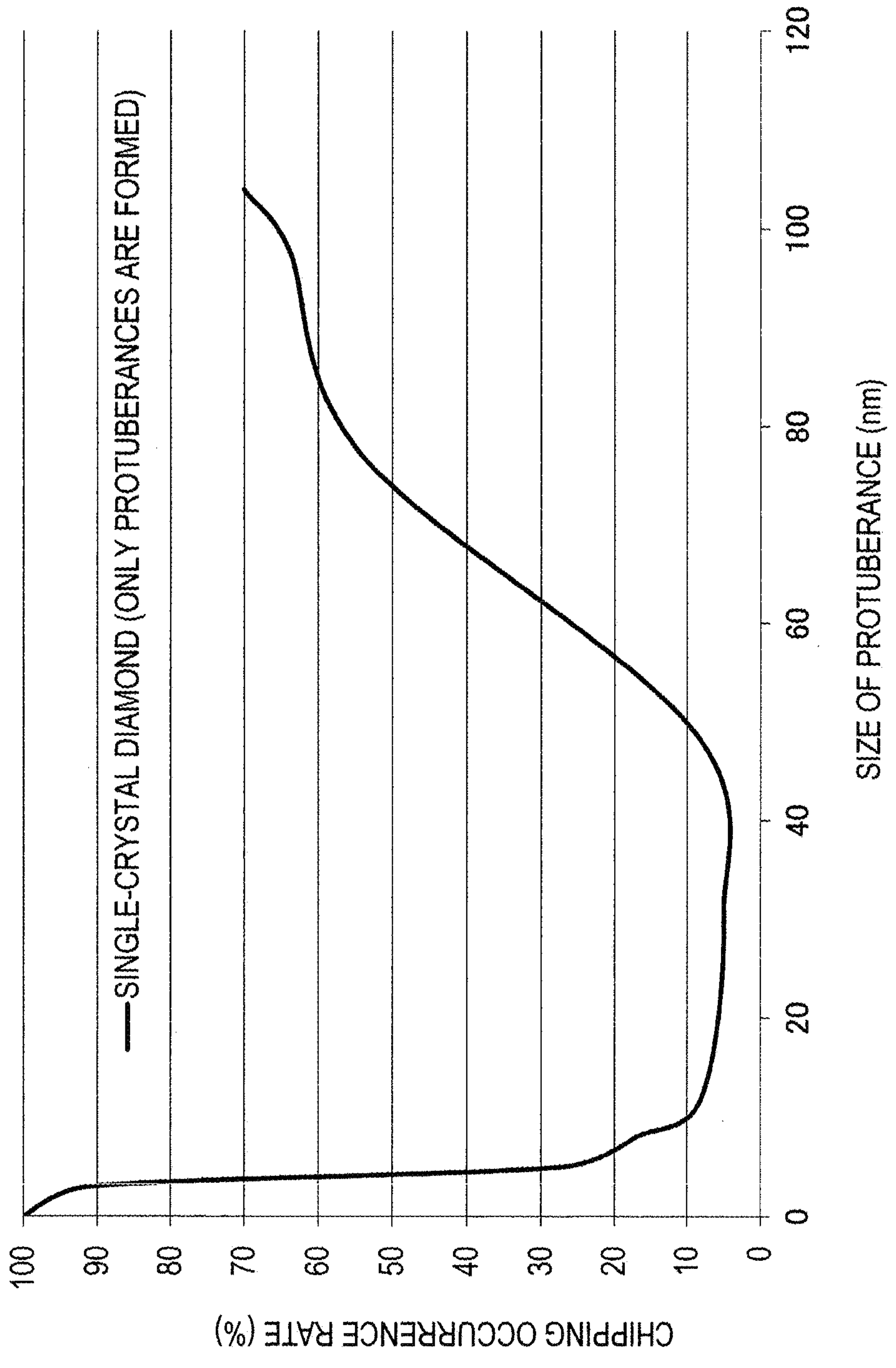
FIG. 17 is a graph showing a relationship between the size of protuberances and the chipping occurrence rate in a total of 10 examples, specifically, examples 28 to 32 and comparative examples 22 to 26.
Figure 19:
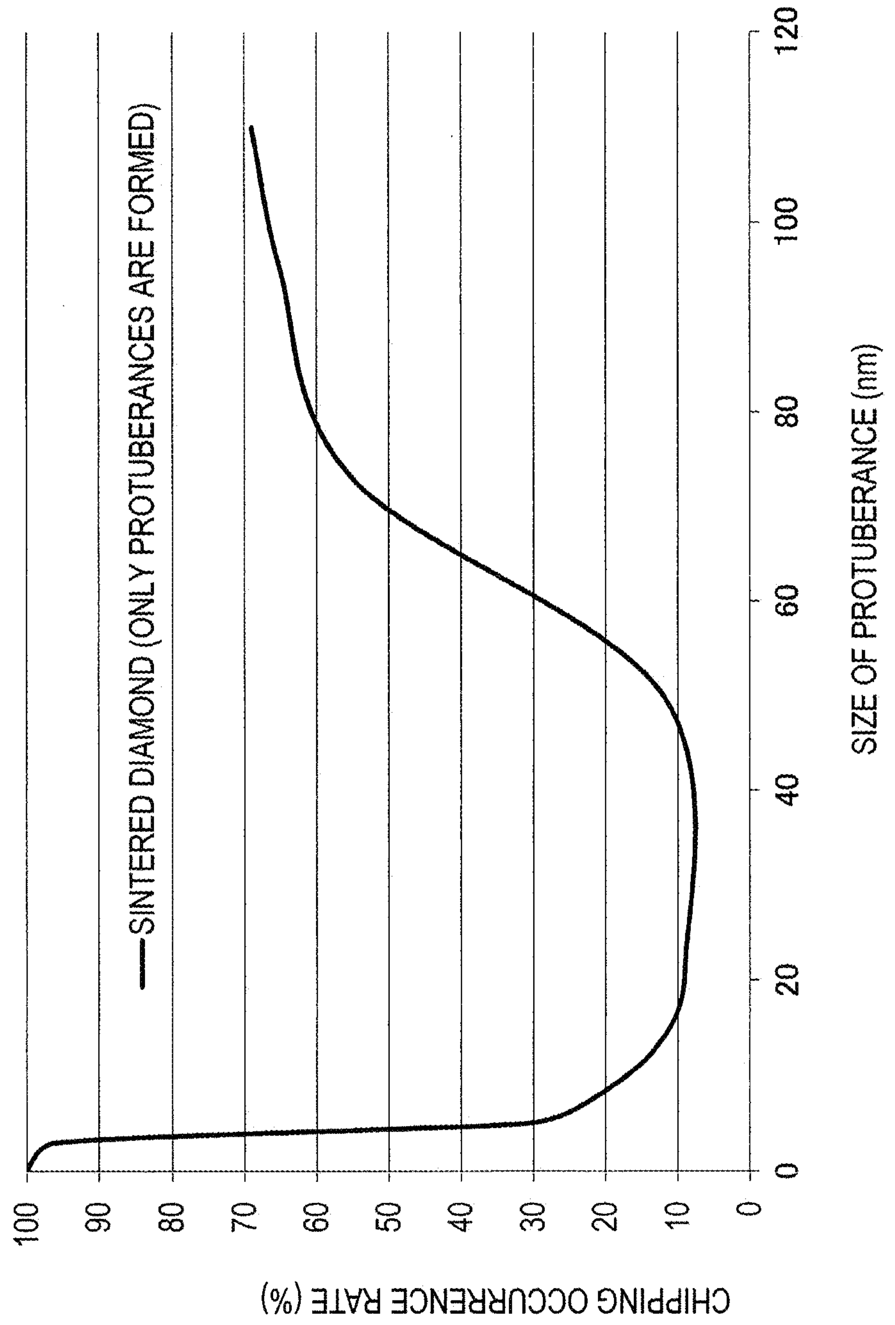
FIG. 19 is a graph showing a relationship between the size of protuberances and the chipping occurrence rate in a total of 10 examples, specifically, examples 37 to 41 and comparative examples 29 to 33.
Figure 21:
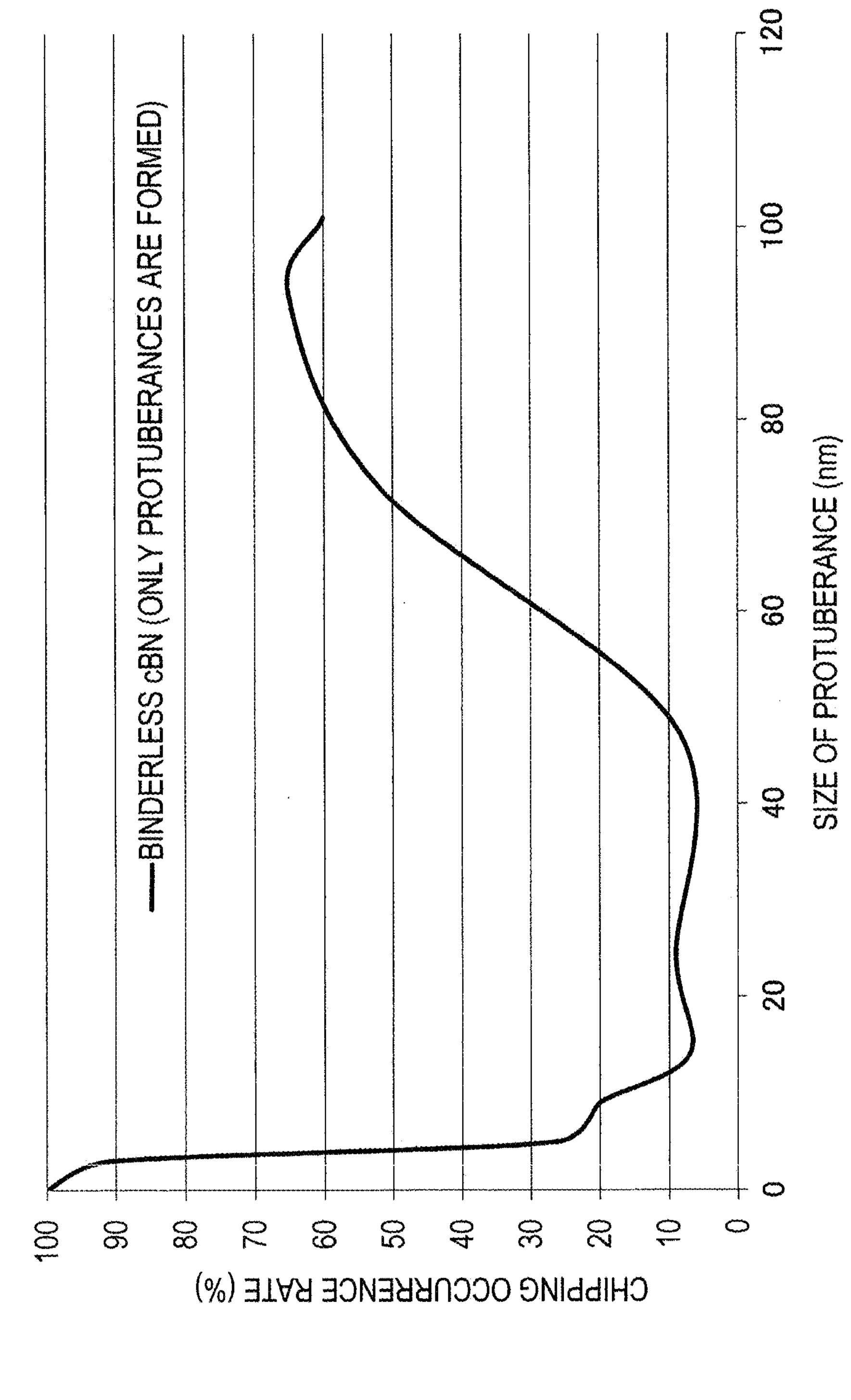
FIG. 21 is a graph showing a relationship between the size of protuberances and the chipping occurrence rate in a total of 10 examples, specifically, examples 46 to 50 and comparative examples 36 to 40.

FIG. 17 shows a relationship between the size of the protuberances and the chipping occurrence rate in a total of 10 examples, specifically, the examples 28 to 32 and the comparative examples 22 to 26. FIG. 19 shows a relationship between the size of the protuberances and the chipping occurrence rate in a total of 10 examples, specifically, the examples 37 to 41 and the comparative examples 29 to 33. FIG. 21 shows a relationship between the size of the protuberances and the chipping occurrence rate in a total of 10 examples, specifically, the examples 46 to 50 and the comparative examples 36 to 40.

Density Ratio: FIGS. 22 to 27

Examples 55 to 81

Samples in examples 55 to 81 had various surface structures on their surfaces formed with the gas cluster ion beam. The samples in the examples 55 to 63 were made of single-crystal diamond, the samples in the examples 64 to 72 were made of sintered diamond, and the samples in the examples 73 to 81 were made of binderless cBN.

In the examples 55 to 81, the density ratio was lower than that of the sample yet to be irradiated with the gas cluster ion beam. In the examples 55 to 81, the average width of the protuberances was equal to or greater than 5 nm and equal to or smaller than 50 nm, and the chipping occurrence rate was equal to or lower than 28%. In particular, if there were dense regions (regions in which a plurality of protuberances were densely concentrated) having an average width of about 50 nm to 530 nm, the chipping occurrence rate was 0% (the examples 60 to 63, 69 to 72 and 78 to 81).

Comparative Examples 43, 50 and 57

The chipping occurrence rate of each sample whose surface had been planarized by mechanical polishing was 100%.

Comparative Examples 44, 51 and 58

The chipping occurrence rate in the case where the average width of the protuberances was 3 nm was 92 to 95%.

Comparative Examples 48, 55 and 62

The density ratio of each sample having the rectangular pattern structure (the average width of the projections was 50 nm) as the surface structure did not differ between before and after dry etching (the density ratio was 100%), and the chipping occurrence rate of each sample was 100%.

Comparative Examples 49, 56 and 63

The density ratio of each sample having the granular deposits as the surface structure decreased, but the chipping occurrence rate of each sample was 100%.

Comparative Examples 45 to 47, 52 to 54 and 59 to 61

Samples in the comparative examples 45 to 47, 52 to 54 and 59 to 61 had various surface structures on their surfaces formed with the gas cluster ion beam. The samples in the comparative examples 45 to 47 were made of single-crystal diamond, the samples in the comparative examples 52 to 54 were made of sintered diamond, and the samples in the comparative examples 59 to 61 were made of binderless cBN.

In these comparative examples, the density ratio was lower than that of the sample yet to be irradiated with the gas cluster ion beam, but the average width of the protuberances was greater than 50 nm, and the chipping occurrence rate was equal to or higher than 50%.

Figure 23:
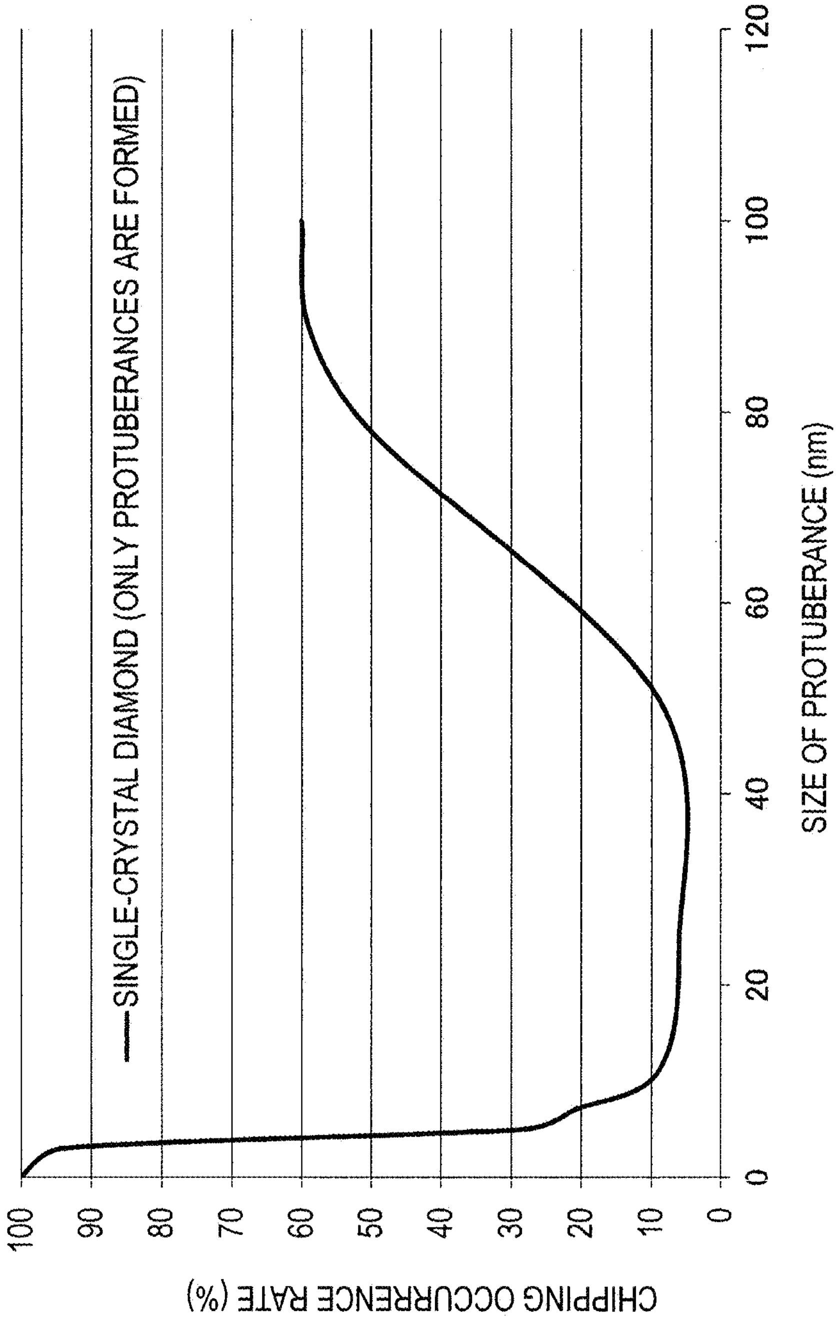
FIG. 23 is a graph showing a relationship between the size of protuberances and the chipping occurrence rate in a total of 10 examples, specifically, examples 55 to 59 and comparative examples 43 to 47.
Figure 25:
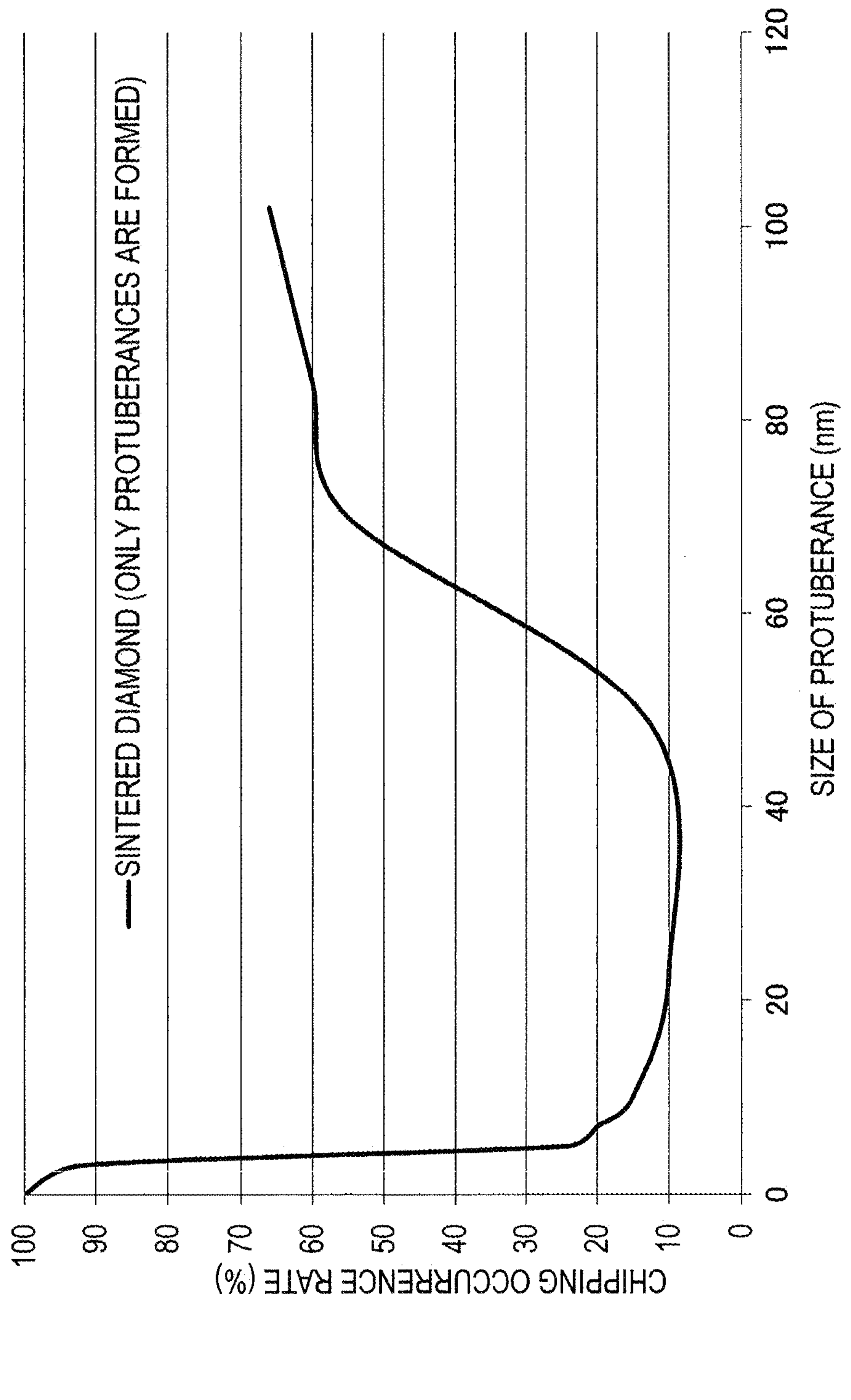
FIG. 25 is a graph showing a relationship between the size of protuberances and the chipping occurrence rate in a total of 10 examples, specifically, examples 64 to 68 and comparative examples 50 to 54.
Figure 27:
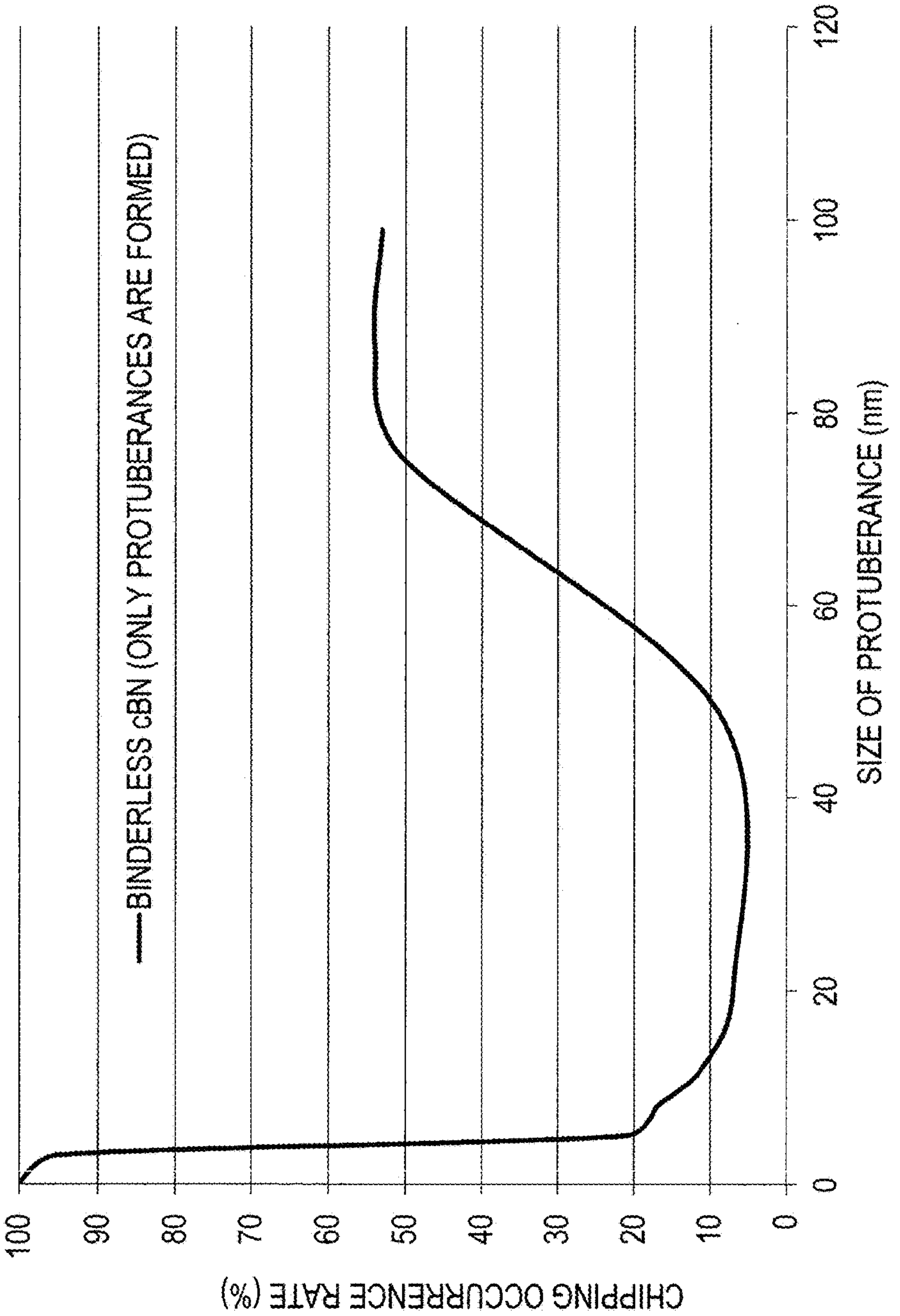
FIG. 27 is a graph showing a relationship between the size of protuberances and the chipping occurrence rate in a total of 10 examples, specifically, examples 73 to 77 and comparative examples 57 to 61.

FIG. 23 shows a relationship between the size of the protuberances and the chipping occurrence rate in a total of 10 examples, specifically, the examples 55 to 59 and the comparative examples 43 to 47. FIG. 25 shows a relationship between the size of the protuberances and the chipping occurrence rate in a total of 10 examples, specifically, the examples 64 to 68 and the comparative examples 50 to 54. FIG. 27 shows a relationship between the size of the protuberances and the chipping occurrence rate in a total of 10 examples, specifically, the examples 73 to 77 and the comparative examples 57 to 61.

Crystallization Ratio: FIGS. 28 to 33

Examples 82 to 108

Samples in examples 82 to 108 had various surface structures on their surfaces formed with the gas cluster ion beam. The samples in the examples 82 to 90 were made of single-crystal diamond, the samples in the examples 91 to 99 were made of sintered diamond, and the samples in the examples 100 to 108 were made of binderless cBN.

In the examples 82 to 108, the crystallization ratio was lower than that of the sample yet to be irradiated with the gas cluster ion beam. In the examples 82 to 108, the average width of the protuberances was equal to or greater than 5 nm and equal to or smaller than 50 nm, and the chipping occurrence rate was equal to or lower than 22%. In particular, if there were dense regions (regions in which a plurality of protuberances were densely concentrated) having an average width of about 50 nm to 530 nm, the chipping occurrence rate was 0% (the examples 87 to 90, 96 to 99 and 105 to 108).

Comparative Examples 64, 71 and 78

The chipping occurrence rate of each sample whose surface had been planarized by mechanical polishing was 100%.

Comparative Examples 65, 72 and 79

The chipping occurrence rate in the case where the average width of the protuberances was 3 nm was 94 to 96%.

Comparative Examples 69, 76 and 83

The crystallization ratio of each sample having the rectangular pattern structure (the average width of the projections was 50 nm) as the surface structure did not differ between before and after dry etching (the crystallization ratio was 100%), and the chipping occurrence rate of each sample was 100%.

Comparative Examples 70, 77 and 84

The crystallization ratio of each sample having the granular deposits as the surface structure decreased, but the chipping occurrence rate of each sample was 100%.

Comparative Examples 66 to 68, 73 to 75 and 80 to 82

Samples in the comparative examples 66 to 68, 73 to 75 and 80 to 82 had various surface structures on their surfaces formed with the gas cluster ion beam. The samples in the comparative examples 66 to 68 were made of single-crystal diamond, the samples in the comparative examples 73 to 75 were made of sintered diamond, and the samples in the comparative examples 80 to 82 were made of binderless cBN.

In these comparative examples, the crystallization ratio was lower than that of the sample yet to be irradiated with the gas cluster ion beam, but the average width of the protuberances was greater than 50 nm, and the chipping occurrence rate was equal to or higher than 50%.

Figure 29:
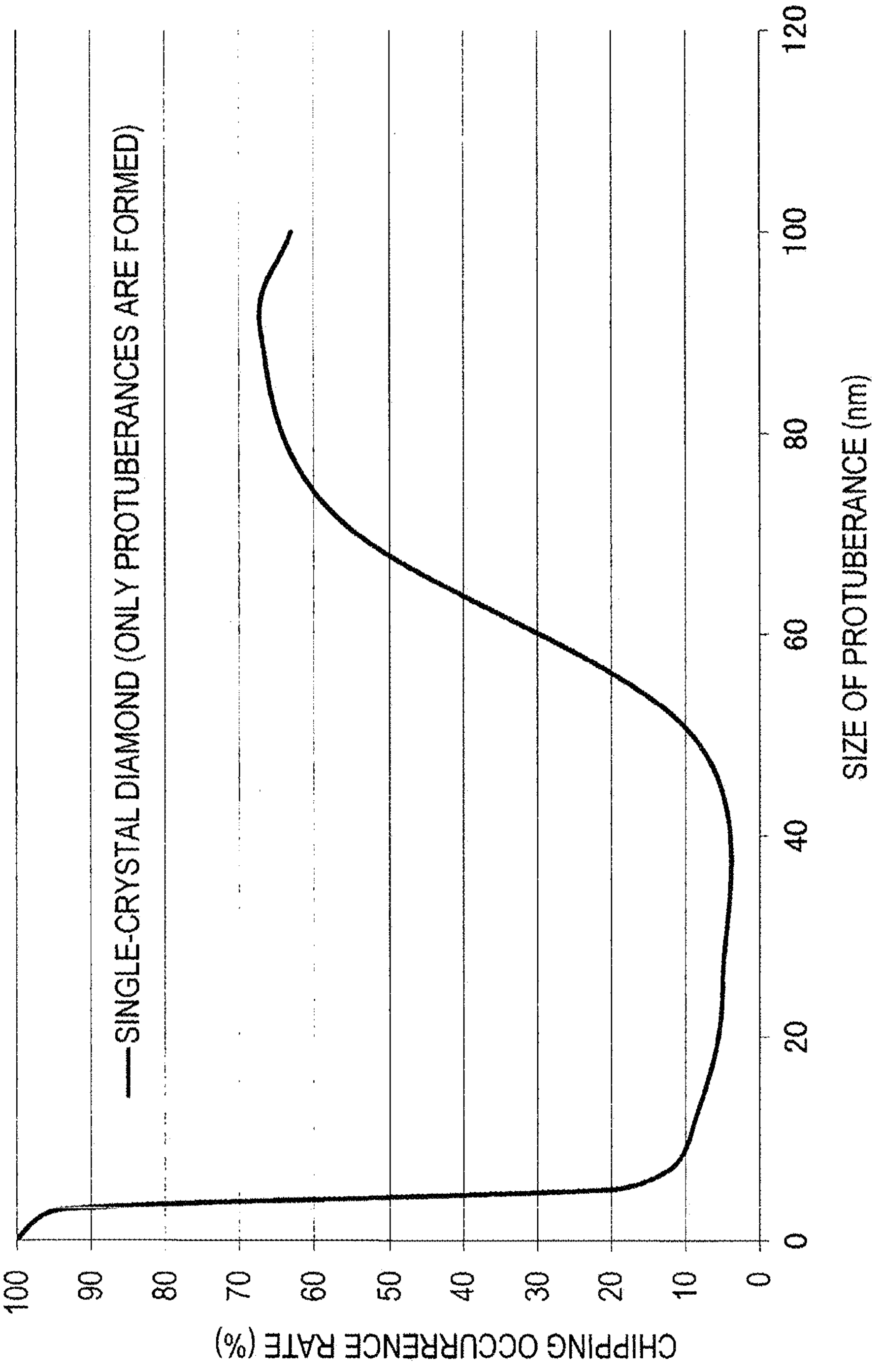
FIG. 29 is a graph showing a relationship between the size of protuberances and the chipping occurrence rate in a total of 10 examples, specifically, examples 82 to 86 and comparative examples 64 to 68.
Figure 31:
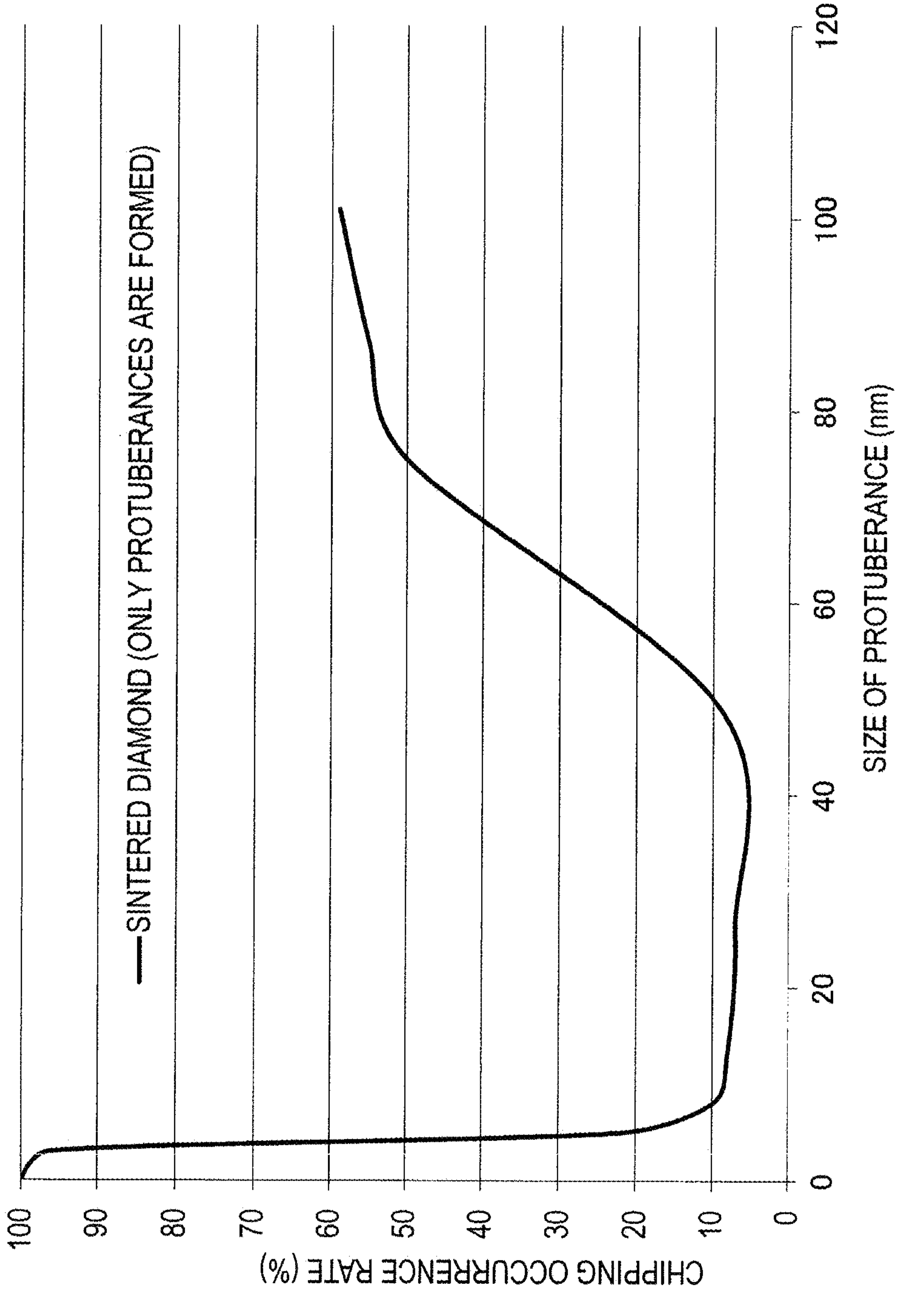
FIG. 31 is a graph showing a relationship between the size of protuberances and the chipping occurrence rate in a total of 10 examples, specifically, examples 91 to 95 and comparative examples 71 to 75.
Figure 33:
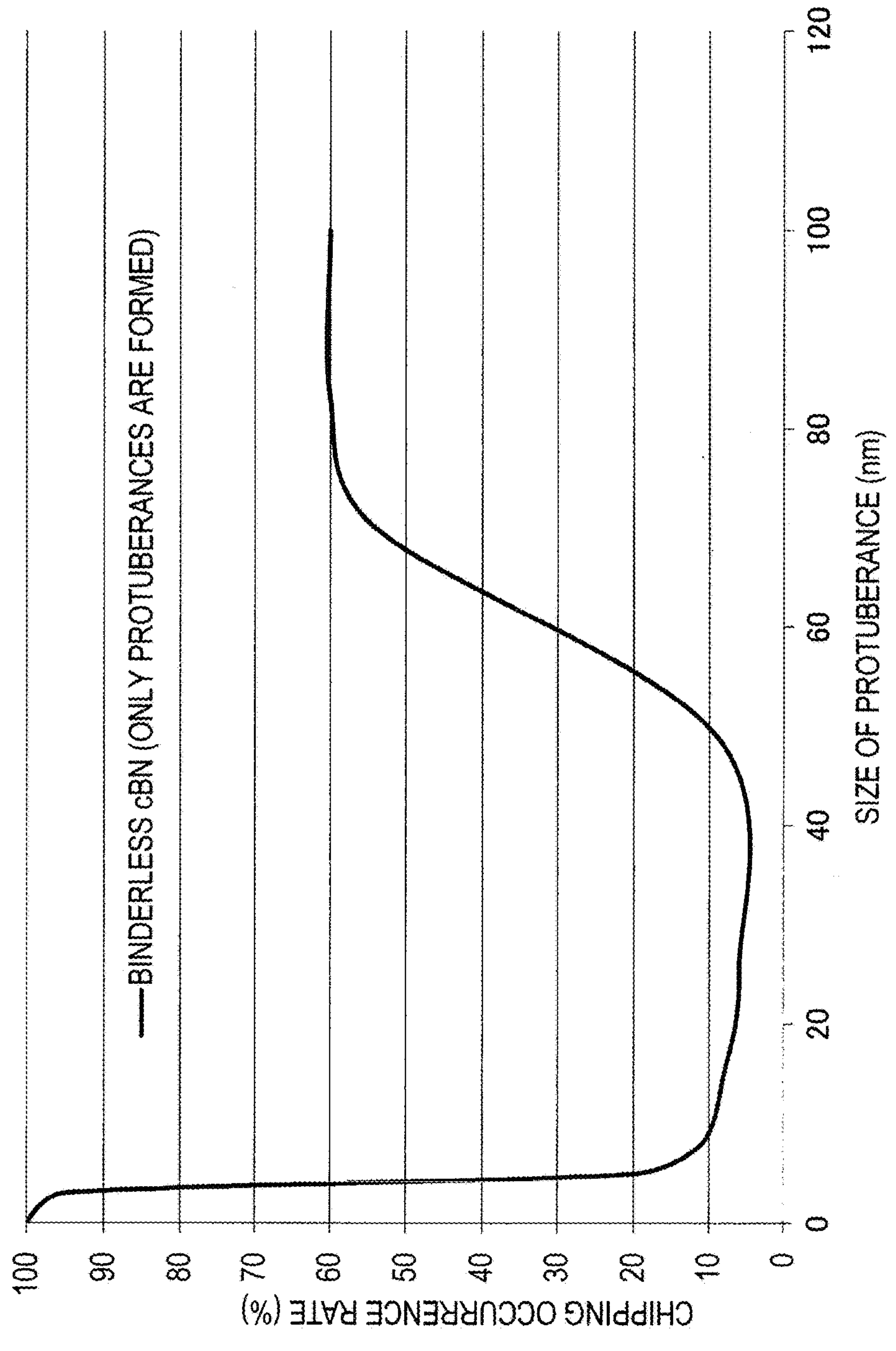
FIG. 33 is a graph showing a relationship between the size of protuberances and the chipping occurrence rate in a total of 10 examples, specifically, examples 100 to 104 and comparative examples 78 to 82.

FIG. 29 shows a relationship between the size of the protuberances and the chipping occurrence rate in a total of 10 examples, specifically, the examples 82 to 86 and the comparative examples 64 to 68. FIG. 31 shows a relationship between the size of the protuberances and the chipping occurrence rate in a total of 10 examples, specifically, the examples 91 to 95 and the comparative examples 71 to 75. FIG. 33 shows a relationship between the size of the protuberances and the chipping occurrence rate in a total of 10 examples, specifically, the examples 100 to 104 and the comparative examples 78 to 82.

Next, examples and comparative examples of a cutting tool, which is a kind of edge tool, will be described. It is to be noted that, although examples of the cutting tool will be illustrated below, the present invention can be applied to any edge tools including a die tool with a cutting edge, such as a press blanking die, and an engraving tool.

Example 109

Cutting tools were fabricated as described below. Edge tools with one cutting edge were fabricated by cutting single-crystal diamond, sintered diamond, binderless cBN sintered body and cemented carbide (JIS class mark Z01) by laser processing and mechanically polishing the cut materials. These edge tools were the cutting tools. The cutting edge was linear and had a length of 1 mm, and the angle between the two surfaces forming the cutting edge was 60°. The cutting edge part was irradiated with a single gas cluster ion beam in the direction opposite to the cutting edge so that the two surfaces forming the cutting edge were irradiated with the gas cluster ion beam at the same angle at the same time (that is, each of the two surfaces was irradiated with the gas cluster ion beam at an angle of 60° with respect to the normal to the surface), thereby forming the surface structure described below on the cutting edge of each cutting tool.

TABLE 1

| | Single-crystal diamond | Sintered diamond | Binderless cBN | Cemented carbide (Z01) |
|---|---|---|---|---|
| Size of protuberance | 25 nm | 27 nm | 18 nm | 32 nm |
| Density of protuberances | 1505 protuberances/$\mu m^2$ | 1054 protuberances/$\mu m^2$ | 1896 protuberances/$\mu m^2$ | 923 protuberances/$\mu m^2$ |
| Size of dense region | 130 nm | 315 nm | 402 nm | — |
| Density of dense regions | 68 dense regions/$\mu m^2$ | 41 dense regions/$\mu m^2$ | 18 dense regions/$\mu m^2$ | — |

Using the cutting edge of each cutting tool as an indenter, a sliding test was conducted on a sample made of cemented carbide by moving back and forth the indenter 1000 times in parallel with the 1-mm side of the sample under a load of 100 grams-force at a speed of 60 cpm. Then, the cutting edge of each cutting tool was examined for a chipping with an electron microscope. No chipping occurred in the cutting edges of the cutting tools made of single-crystal diamond, sintered diamond and binderless cBN. One chipping of 0.1 mm or larger occurred in the cutting edge of the cutting tool made of cemented carbide.

Comparative Example for Example 109

Edge tools with one cutting edge were fabricated by cutting single-crystal diamond, sintered diamond and binderless cBN sintered body by laser processing and mechanically polishing the cut materials. These edge tools were the cutting tools. The cutting edge was linear and had a length of 1 mm, and the angle between the two surfaces forming the cutting edge was 60°. This comparative example differed from the example 109 in that the cutting edge part of each cutting tool was not irradiated with the gas cluster ion beam. That is, the cutting edge part of each cutting tool in this comparative example was just planarized by mechanical polishing. Using the cutting edge of each cutting tool as an indenter, the sliding test was conducted on a copper sample. A large number of chippings of 0.1 mm or larger occurred in the cutting edges of all the cutting tools.

Next, examples in which other inorganic solid-state materials than those used in the examples 1 to 108 were used and comparative examples therefor will be described.

Example 110

A rectangular parallelepiped sample having a length of 5 mm, a width of 1 mm and a thickness of 0.3 mm was fabricated by cutting soda-lime glass having a thickness of 0.3 mm that can be used as a cover glass for a touch panel. The whole of the 5-mm by 1-mm surface was irradiated with the gas cluster ion beam in the normal direction to form, on the soda-lime glass surface, a surface structure in which protuberances having a size (average width) of 31 nm were formed with a density of 958 protuberances/$\mu m^2$. The sample was placed on the sliding tester with the surface irradiated with the gas cluster ion beam facing up, the same sliding test as in the examples 1 to 108 except that the load was 10 grams-force was conducted, and the chipping occurrence rate was calculated. The chipping occurrence rate was 6%.

Comparative Example for Example 110

A rectangular parallelepiped sample having a length of 5 mm, a width of 1 mm and a thickness of 0.3 mm was fabricated by cutting soda-lime glass having a thickness of 0.3 mm that can be used as a cover glass for a touch panel. This comparative example differed from the example 110 in that the surfaces of the sample were not irradiated with the gas cluster ion beam. The sample was placed on the sliding tester, the same sliding test as in the example 110 was conducted, and the chipping occurrence rate was calculated. The chipping occurrence rate was 100%.

Example 111

A rectangular parallelepiped sample was fabricated by cutting single-crystal silicon, which can be used as a medical scalpel, into a size of 5 mm in length, 1 mm in width and 0.5 mm in thickness and mechanically polishing two surfaces of a 5-mm by 1-mm surface and a 1-mm by 0.5-mm surface. The right-angle edge formed by the two surfaces sharing one 5-mm side was irradiated with the gas cluster ion beam in the direction opposite to the right-angle edge so that the two surfaces were irradiated with the gas cluster ion beam at the same angle at the same time (that is, each of the two surfaces was irradiated with the gas cluster ion beam at an angle of 45° with respect to the normal to the surface), thereby forming, on the sample, a surface structure in which protuberances having a size (average width) of 15 nm were formed with a density of 2468 protuberances/$\mu m^2$. The sample was placed on the sliding tester with the 5-mm by 1-mm surface irradiated with the gas cluster ion beam facing up, the same sliding test as in the examples 1 to 108 except that the load was 10 grams-force was conducted, and the chipping occurrence rate was calculated. The chipping occurrence rate was 4%.

Comparative Example for Example 111

A rectangular parallelepiped sample was fabricated by cutting single-crystal silicon into a size of 5 mm in length, 1 mm in width and 0.5 mm in thickness and mechanically polishing two surfaces of a 5-mm by 1-mm surface and a 1-mm by 0.5-mm surface. This comparative example differed from the example 111 in that the surfaces of the sample were not irradiated with the gas cluster ion beam. The sample was placed on the sliding tester, the same sliding test as in the example 111 was conducted, and the chipping occurrence rate was calculated. The chipping occurrence rate was 100%.

[Considerations]

As can be seen from the examples 1 to 108 and the comparative examples 1 to 84 as well as the examples 109, 110 and 111 and the comparative examples therefor, for any of single-crystal diamond, sintered diamond, binderless cBN, cemented carbide, glass and silicon, the chipping occurrence rate remarkably decreases if the size of the protuberances formed by irradiation with the gas cluster ion beam is equal to or greater than 5 nm and equal to or smaller than 50 nm, and the strength of the nonmetal inorganic solid-state material with protuberances having sizes falling within the above-described range formed by irradiation with the gas cluster ion beam is improved regardless of the kind of the nonmetal inorganic solid-state material. It can be further seen that for any nonmetal inorganic solid-state material, the physical properties (hardness, Young's modulus, density and crystallization ratio) of the surface structure differ from those of the interior of the nonmetal inorganic solid-state material lying below the surface structure because of the irradiation with the gas cluster ion beam.

As can be seen from the examples 1 to 108 and the comparative examples 1 to 84, the chipping occurrence rate can be highly effectively reduced if not only protuberances but also dense regions thereof are formed.

The reason why the inorganic solid-state material with the surface structure described above formed by irradiation with the gas cluster ion beam has an improved strength has not been fully understood. However, possible reasons are as follows.

Figure 34:
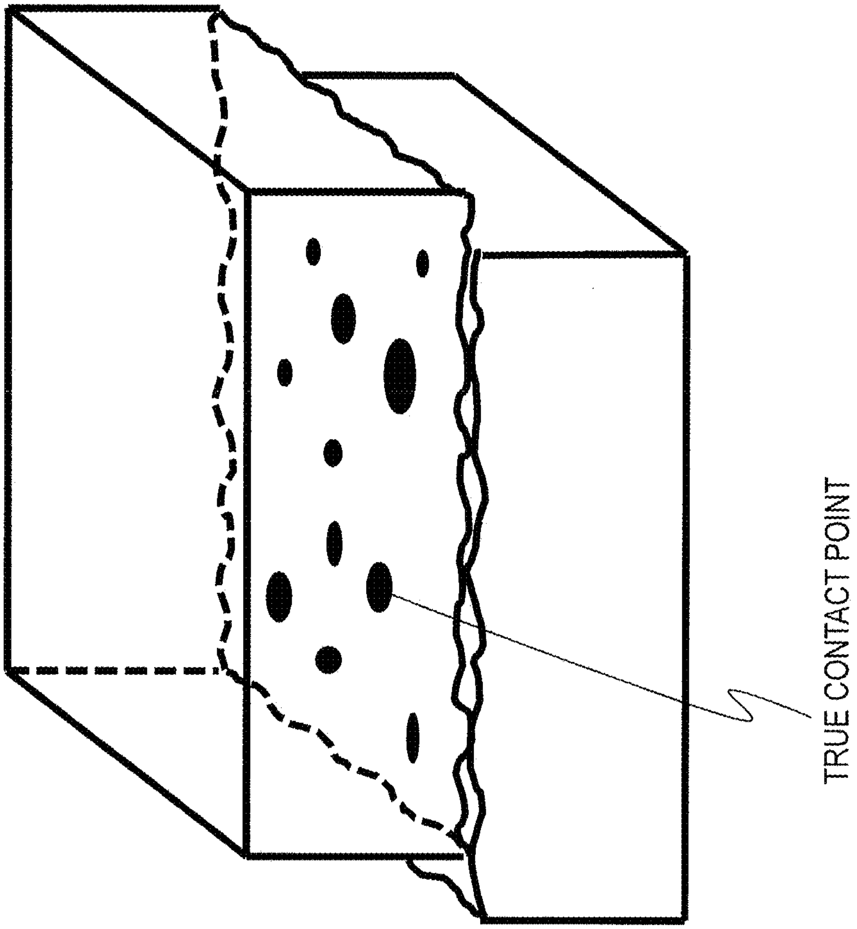
FIG. 34 is a schematic diagram showing a contact surface in the case where surfaces of inorganic solid-state materials come into contact with each other.

In the following, description will be made with reference to FIG. 34. FIG. 34 is a schematic diagram showing a contact surface in the case where surfaces of inorganic solid-state materials come into contact with each other. The surfaces of the inorganic solid-state materials have a surface roughness, so that the area of the parts (true contact points) at which each inorganic solid-state material is actually in contact with the other is considerably smaller than the area of the whole surface of the inorganic solid-state material. Therefore, when a pressure is applied to the surface of the inorganic solid-state material, the force is actually concentrated in extremely small regions of the surface of the inorganic solid-state material. Thus, it can be considered that the force on the surface of one inorganic solid-state material is applied by the tip of an extremely small protrusion on the surface of the other inorganic solid-state material. In view of this, cases where a force is applied to the surface of an inorganic solid-state material will be investigated with reference to FIG. 35, in which a protrusion on the surface of the other solid-state material, with which the surface described above comes into contact, is shown as a semicircle.

Figures 35A, 35B:
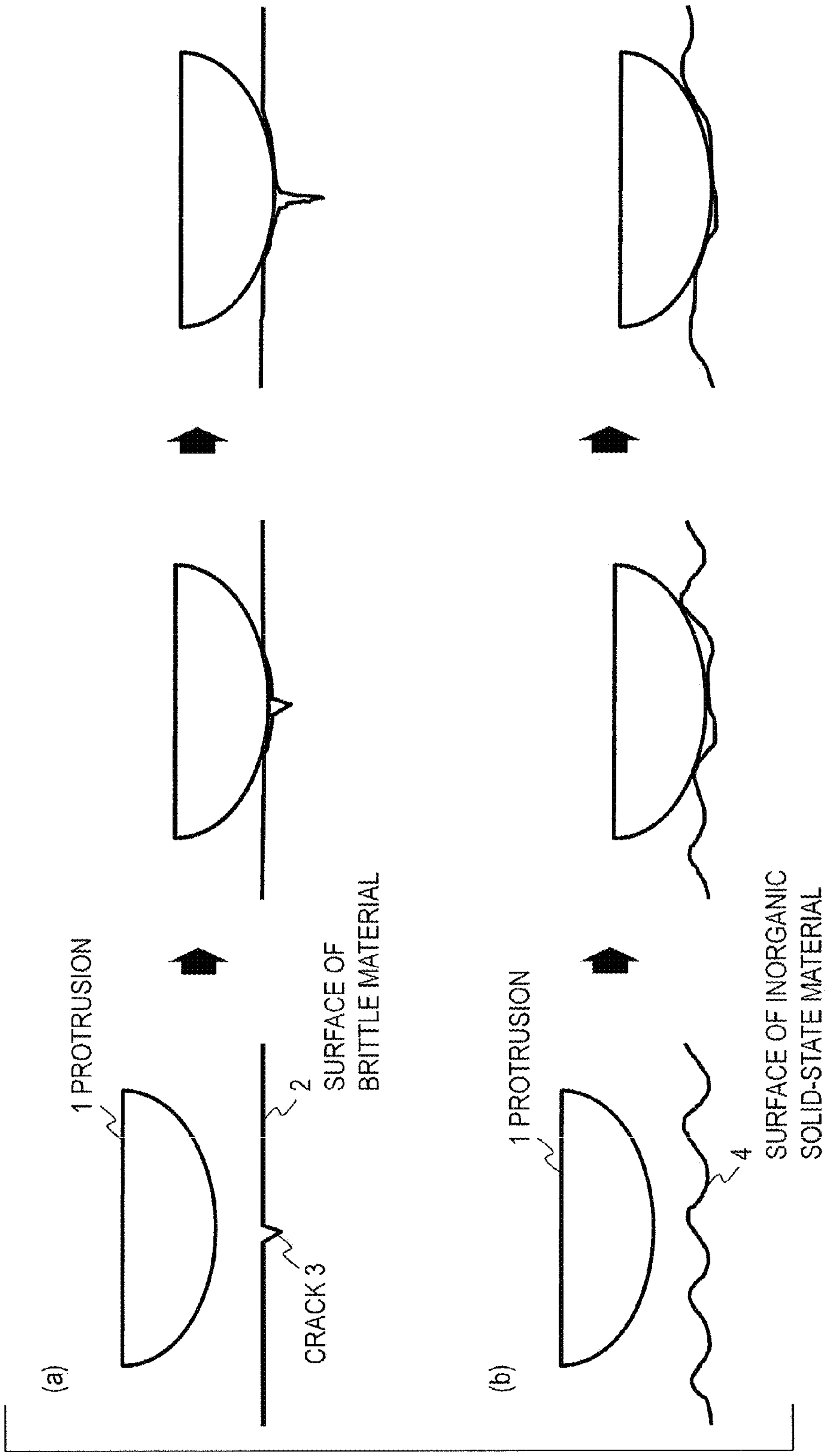
FIGS. 35(*a*), (*b*) are schematic diagrams showing, for comparison, cases where a force is applied to surfaces of two different materials, FIG. 35(*a*) showing a case where a force is applied to a surface of a conventional brittle material, and FIG. 35(*b*) showing a case where a force is applied to a surface of an inorganic solid-state material according to an embodiment.

FIGS. 35(*a*) and 35(*b*) are schematic diagrams showing, for comparison, a surface of a conventional brittle material and a surface of the inorganic solid-state material according to an embodiment of the present invention in the case where a force is applied by a protrusion 1 on another solid material. In the case of the conventional brittle material, even if the protrusion 1 applies a force to the part of the material at which it is in contact with the material, a significant elastic deformation or plastic deformation does not occur (because the part in contact with the protrusion 1 has the same properties as the interior of the inorganic solid-state material and thus is brittle). As a result, the force is not distributed, the stress is concentrated at a crack 3 in a surface 2 of the brittle material, and the crack 3 develops into the brittle material (see FIG. 35(*a*)).

On the other hand, on a surface 4 of the inorganic solid-state material according to an embodiment of the present invention, protuberances and dense regions in which protuberances are densely concentrated are formed, which are shown in FIG. 35(*b*) as projections and depressions on the surface. If a force is applied to the surface, the protuberances and the dense regions can be deformed to conform to the shape of the protrusion (see FIG. 35(*b*)). The surface is less brittle than the interior of the inorganic solid-state material lying below the surface structure and therefore can be elastically or plastically deformed. Since the stress can be distributed in this way (if the dense regions are formed, the force can be received in a wider area than one protuberance), the occurrence of a cracking can be reduced. The recesses between the protuberances do not serve as a starting point of a cracking but serve as gaps that accommodate deformation of the protuberances.

In particular, since the dense regions are formed by protuberances densely concentrated and are higher than single protuberances as described above, when a force is applied to a dense region, the dense region is more smoothly elastically or plastically deformed to conform to the shape of the protrusion 1 of the other material (lateral deformation), so that the stress can be distributed. Because of the lateral deformation, the effect of distributing the stress increases compared with the surface in which the protuberances are substantially uniformly formed.

In addition, there is a transition layer, in which a physical property continuously changes, but not a solid-solid interface, in which a physical property discontinuously changes, between the surface structure and the interior of the inorganic solid-state material. The presence of the transition layer is pointed out in the reference literature ("Basic and Application of Cluster Ion Beam", written and edited by Isao Yamada, Nikkan Kogyo Shimbun, 2006, p. 130 to 131). According to the present invention, the force applied to the surface structure can be received by the whole of the interior of the inorganic solid-state material through the transition layer, and the stress is not concentrated at the solid-solid interface. Referring again to FIG. 6, which shows an electron microscopic image of a part of the surface structure in which a cross section thereof can be observed, any difference in contrast caused by a discontinuous change of a physical property is not observed in the part between the protuberances and the interior of the inorganic solid-state material, and therefore, it is ascertain that there is no solid-solid interface. In this way, with the inorganic solid-state material according to the present invention, the stress can be distributed in both the lateral direction parallel with the surface of the inorganic solid-state material and the direction from the surface toward the interior, the occurrence of a cracking in the inorganic solid-state material can be remarkably reduced.

Figures 36A, 36B:
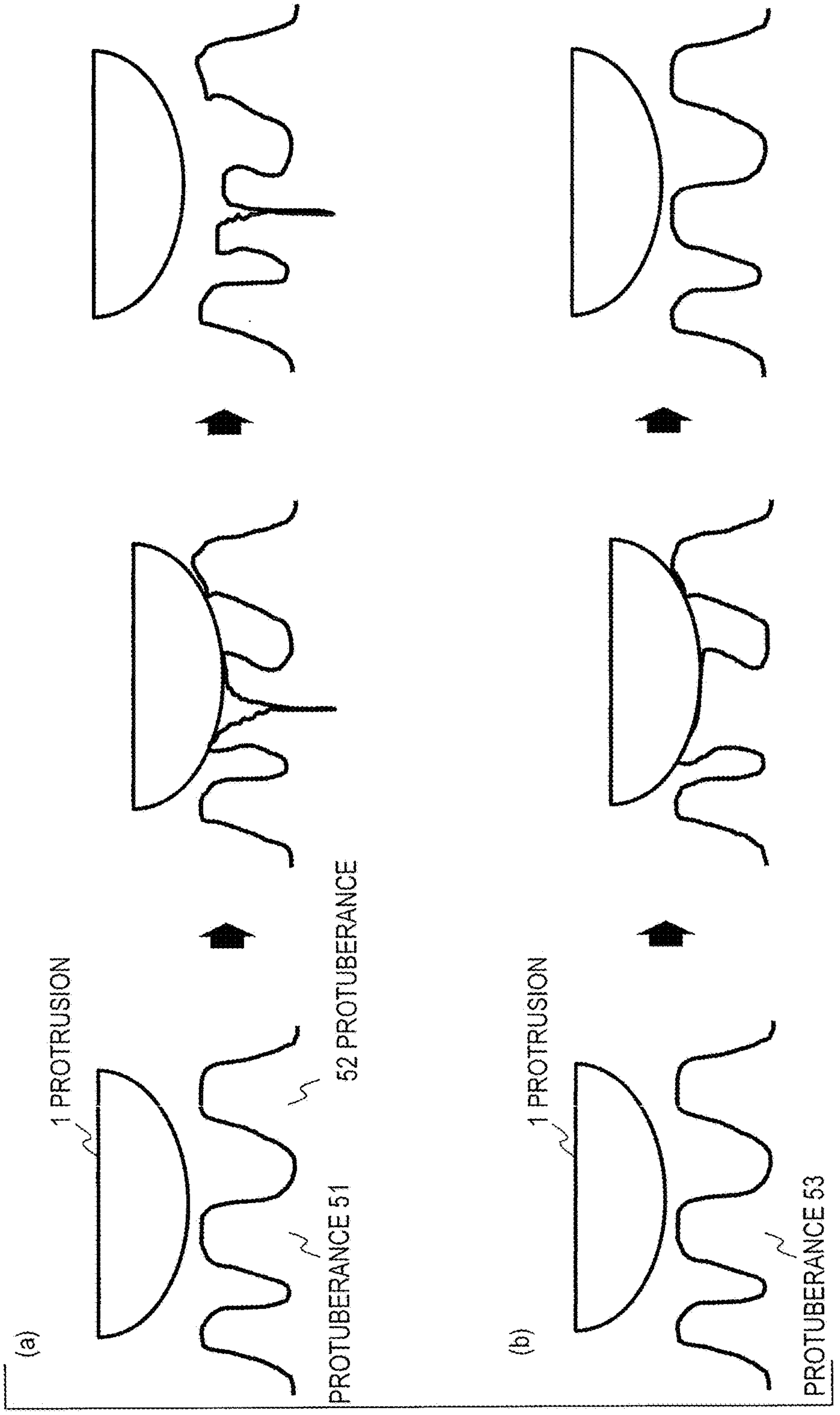
FIGS. 36(*a*), (*b*) are schematic diagrams showing, for comparison, cases where a force is applied to surfaces of two different inorganic solid-state materials on which different types of protuberances are formed, FIG. 36(*a*) showing a case where a force is applied to a surface of an inorganic solid-state material on which brittle protuberances are formed, and FIG. 36(*b*) showing a case where a force is applied to a surface of an inorganic solid-state material with protuberances having sizes equal to or greater than 5 nm and equal to or smaller than 50 nm formed thereon by irradiation with a gas cluster ion beam.

FIGS. 36(*a*) and 36(*b*) are schematic diagrams showing, for comparison, a case where brittle protuberances (protuberances formed by patterning, for example) are formed on the surface of the inorganic solid-state material (FIG. 36(*a*)) and a case where protuberances having a size equal to or greater than 5 nm and equal to or smaller than 50 nm are formed on the surface of the inorganic solid-state material by irradiation with the gas cluster ion beam (FIG. 36(*b*)). In FIG. 36(*a*), if a part of the protrusion 1 around the tip thereof comes into contact with a protuberance 51 to apply a high force to the protuberance 51, the brittle protuberance 51 is plastically deformed to some extent to relieve the stress. However, the ability of relieving the stress is inadequate, so that the stress is concentrated at a certain part (a part where there is a structural defect, such as a crack, for example) of the surface of the protuberance 51, and a cracking occurs at the part. If a part of the protrusion 1 around the tip thereof comes into contact with a protuberance 52 to apply a low force to the protuberance 52, the brittle protuberance 52 is plastically deformed. However, the plastically deformed protuberance 52 does not recover the original shape even if the force is removed. On the other hand, a protuberance 53 shown in FIG. 36(*b*) is no longer brittle, the protuberance 53 is elastically and plastically deformed in response to the force applied by the protrusion 1, thereby reducing the occurrence of a cracking. In addition, when the force is removed, although a part remains plastically deformed, most part of the protuberance 53 substantially recovers the original shape and can relieve a stress again.

Figures 37A, 37B, 37C:
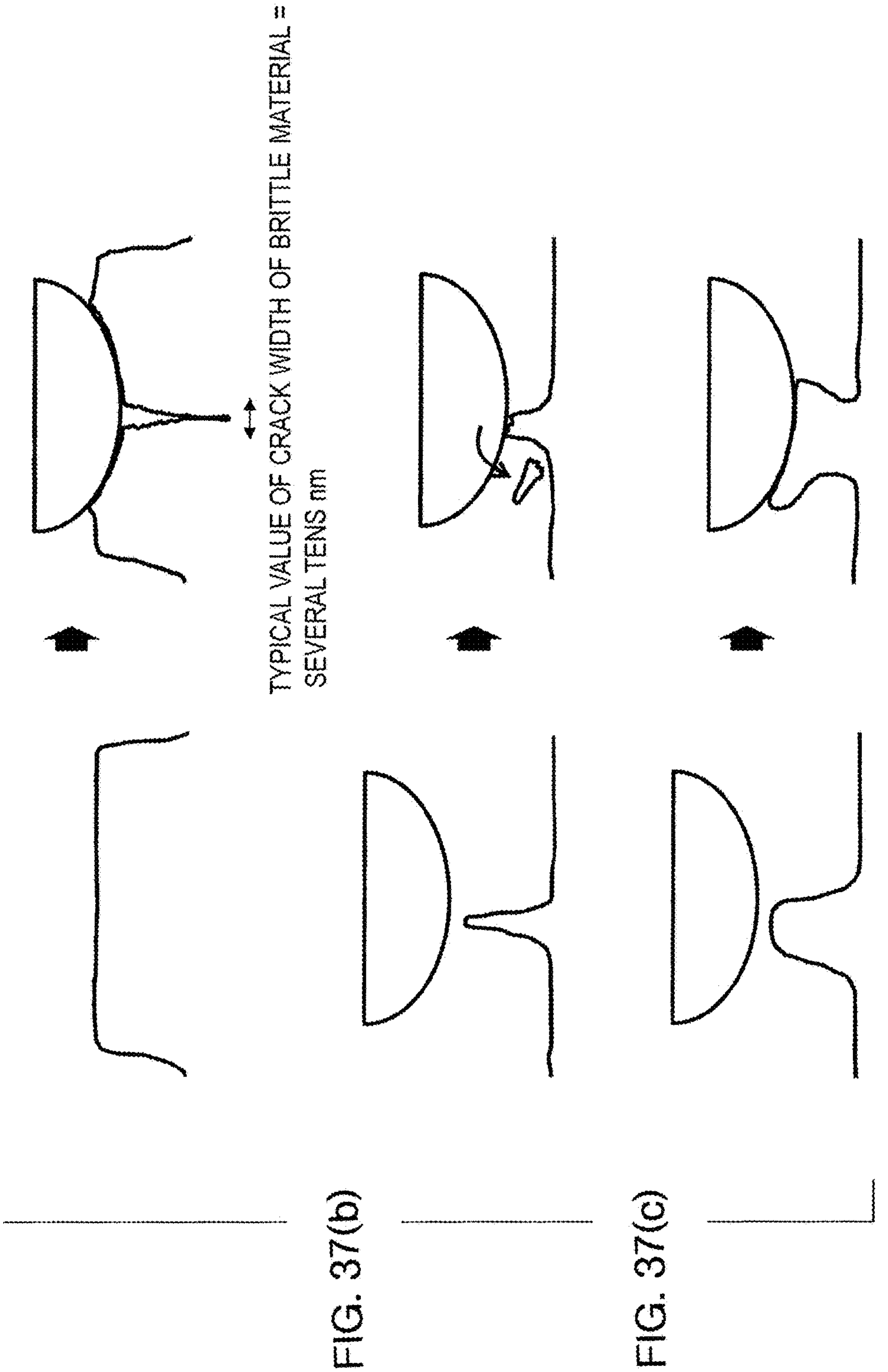
FIGS. 37(*a*)-(*c*) are schematic diagrams for illustrating that the chipping occurrence rate varies depending on the average width of the protuberances, FIG. 37(*a*) showing a case where the average width of the protuberances is considerably greater than 50 nm, FIG. 37(*b*) showing a case where the average width of the protuberances is smaller than 5 nm, and FIG. 37(*c*) showing a case where the average width of the protuberances ranges from 5 nm to 50 nm.

A possible reason why the chipping occurrence rate significantly decreases in the case where the average width of the protuberances falls within the range of 5 nm to 50 nm is as follows. A typical value of the width of a crack that serves as a starting point of a chipping is several tens of nm (reference literature: Hitoshi Sumiya and Tetsuo Irifune, SEI Technical Review, VOL. 172, January 2008, p. 82, FIG. 14 showing a transmission electron microscopic image of a typical crack having a width of about 20 nm of many cracks having widths equal to or smaller than 100 nm found in the vicinity of an indentation formed by an indenter in the surface of polycrystalline diamond when a force is applied thereto). If the average width of the protuberances is considerably greater than several tens of nm, a crack can occur in the surface of the protuberances. And if a force is applied and the stress cannot be adequately relieved in the vicinity of the crack, it is considered that a cracking can develop from the crack (see FIG. 37(*a*)). In the microscopic view, it is considered that the true contact point to which the protrusion on the surface of the other solid-state material actually applies a high force has a size of the order of several nm to several tens of nm. If the average width of the protuberances is smaller than this size, the protuberances cannot adequately bear the applied force and collapse rather than being elastically or plastically deformed (see FIG. 37(*b*)). This is supported by the comparative examples 2, 9, 16, 23, 30, 37, 44, 51, 58, 65, 72 and 79. As a result, it is considered that a part of the surface structure collapses, and a cracking develops from the part. As can be seen from the above description, in order for the protuberances to serve to effectively reduce the chipping occurrence rate, the average width of the protuberances needs to fall within an optical range, and it is considered that the optical range is the range of 5 nm to 50 nm, which is shown by the experiments. If the average width of the protuberances falls within the range of 5 nm to 50 nm, it is considered that the protuberances can be elastically or plastically deformed to adequately relieve the force actually applied by the protrusion on the surface of the other solid-state material in the microscopic view (see FIG. 37(*c*)).

A possible reason why the protuberances are no longer brittle compared with the interior of the inorganic solid-state material as described above is that the irradiation with the gas cluster ion beam has an effect to improve the quality of the surface. When the surface of the inorganic solid-state material is irradiated with the gas cluster ion beam, each cluster with a given kinetic energy collides with the surface of the solid-state material and collapses into individual ions. However, each collision completes in a short time, so that a high pressure is momentarily applied to the point of collision of the cluster. The pressure momentarily applied to the surface layer of the solid-state material causes the surface structure to change in such a manner that the Young's modulus of the surface structure is smaller than the young's modulus of the interior of the inorganic solid-state material, and the young's modulus in the boundary region between the interior of the inorganic solid-state material and the surface structure gradually changes as it goes from the interior of the inorganic solid-state material to the surface structure, in such a manner that the density of the surface structure is smaller than the density of the interior of the inorganic solid-state material, and the density in the boundary region between the interior of the inorganic solid-state material and the surface structure gradually changes as it goes from the interior of the inorganic solid-state material to the surface structure, in such a manner that the hardness of the surface structure is smaller than the hardness of the interior of the inorganic solid-state material, and the hardness in the boundary region between the interior of the inorganic solid-state material and the surface structure gradually changes as it goes from the interior of the inorganic solid-state material to the surface structure, or in such a manner that the surface structure has an amorphous structure, the interior of the inorganic solid-state material has a crystalline structure, the structure of the boundary region between the interior of the inorganic solid-state material and the surface structure gradually changes from the crystalline structure to the amorphous structure as it goes from the interior of the inorganic solid-state material to the surface structure. It is considered that, because of such a surface quality improvement effect of the irradiation with the gas cluster ion beam, the protuberances come to have the tendency to be more readily elastically or plastically deformed than the interior of the inorganic solid-state material and can alleviate stress concentration.

On the other hand, a rectangular pattern structure formed on the surface of the inorganic solid-state material by patterning has the same physical properties as those of the interior of the inorganic solid-state material and therefore is brittle. Therefore, the rectangular pattern structure has no effect to alleviate stress concentration.

If granular deposits are formed by deposition on the surface of the inorganic solid-state material, the physical properties of the surface of the inorganic solid-state material differ from those of the interior of the inorganic solid-state material because of the formation of the granular deposits (specifically, the hardness, the Young's modulus, the density, the crystallization ratio or the like can be reduced). However, in the case where the granular deposits are formed by deposition, there is a solid-solid interface between the granular deposits and the inorganic solid-state material lying below the granular deposits. In other words, there is a boundary in which the physical properties discontinuously change between the surface structure (film part) formed by the granular deposits and the inorganic solid-state material lying below the surface structure. The solid-solid interface constituting the boundary has only a little effect to distribute the force applied to the surface structure into the inorganic solid-state material, and the stress is concentrated on the solid-solid interface. Thus, if an impact is applied to the surface of the inorganic solid-state material with the granular deposits formed thereon by deposition, even if the individual granular deposits can be plastically or elastically deformed, the force applied to the whole of the surface structure is concentrated on the solid-solid interface, and the granular deposits (film part) peel off the surface of the inorganic solid-state material. The strength of the inorganic solid-state material from which the film part has been removed is not improved, and the same effect as that of the present invention cannot be achieved.

Even in the case where the surface structure of the granular deposits is formed by deposition, if some type of energization (irradiation with laser, an ion beam, a gas cluster ion beam or the like, for example) is conducted in the course of the deposition to form a transition layer in which a physical property continuously changes in the boundary between the deposits (film part) and the inorganic solid-state material lying below the deposits, there is no solid-solid interface, and the same effect as that of the present invention can be achieved.

The foregoing description of the embodiments of the invention has been presented for the purpose of illustration and description. It is not intended to be exhaustive or to limit the invention to the precise form disclosed. Modifications or variations are possible in light of the above teachings. The embodiment was chosen and described to provide the illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A chipping-proof nonmetal inorganic solid-state material, wherein said inorganic solid-state material has, in at least a part of a surface thereof, a surface structure in which a network of recesses and protuberances surrounded by the recesses are formed, said protuberances have an average width of 5 nm to 50 nm, a physical property of said surface structure differs from the physical property of an interior of said inorganic solid-state material lying below said surface structure, and there is no solid-solid interface between said surface structure and the interior of said inorganic solid-state material.

2. A chipping-proof nonmetal inorganic solid-state material, wherein said inorganic solid-state material has, in at least a part of a surface thereof, a surface structure in which a network of recesses and protuberances surrounded by the recesses are formed, said protuberances have an average width of 5 nm to 50 nm, a physical property of said surface structure differs from the physical property of an interior of said inorganic solid-state material lying below said surface structure, and there is no solid-solid interface between said surface structure and the interior of said inorganic solid-state material, therefore each of said protuberances has a physical property of readily deforming at least either elastically or plastically in comparison with the interior of said inorganic solid-state material.

3. A chipping-proof nonmetal inorganic solid-state material, wherein said inorganic solid-state material has, in at least a part of a surface thereof, a surface structure in which a network of recesses and protuberances surrounded by the recesses are formed, said protuberances have an average width of 5 nm to 50 nm, the Young's modulus of said surface structure is smaller than the Young's modulus of an interior of said inorganic solid-state material lying below said surface structure, and there is no solid-solid interface between said surface structure and the interior of said inorganic solid-state material, therefore each of said protuberances has a physical property of readily deforming at least either elastically or plastically in comparison with the interior of said inorganic solid-state material.

4. A chipping-proof nonmetal inorganic solid-state material, wherein said inorganic solid-state material has, in at least a part of a surface thereof, a surface structure in which a network of recesses and protuberances surrounded by the recesses are formed, said protuberances have an average width of 5 nm to 50 nm, the density of said surface structure is smaller than the density of an interior of said inorganic solid-state material lying below said surface structure, and there is no solid-solid interface between said surface structure and the interior of said inorganic solid-state material, therefore each of said protuberances has a physical property of readily deforming at least either elastically or plastically in comparison with the interior of said inorganic solid-state material.

5. A chipping-proof nonmetal inorganic solid-state material, wherein said inorganic solid-state material has, in at least a part of a surface thereof, a surface structure in which a network of recesses and protuberances surrounded by the recesses are formed, said protuberances have an average width of 5 nm to 50 nm, the hardness of said surface structure is smaller than the hardness of an interior of said inorganic solid-state material lying below said surface structure, and there is no solid-solid interface between said surface structure and the interior of said inorganic solid-state material, therefore each of said protuberances has a physical property of readily deforming at least either elastically or plastically in comparison with the interior of said inorganic solid-state material.

6. A chipping-proof nonmetal inorganic solid-state material, wherein said inorganic solid-state material has, in at least a part of a surface thereof, a surface structure in which a network of recesses and protuberances surrounded by the recesses are formed, said protuberances have an average width of 5 nm to 50 nm, said surface structure has an amorphous structure, an interior of said solid-state material lying below said surface structure has a crystalline structure, and a boundary region between the interior of said inorganic solid-state material and said surface structure has a structure that gradually changes from the crystalline structure to the amorphous structure as it goes from the interior of said inorganic solid-state material to said surface structure, therefore each of said protuberances has a physical property of readily deforming at least either elastically or plastically in comparison with the interior of said inorganic solid-state material.

7. The chipping-proof nonmetal inorganic solid-state material according to claim 1, wherein there are regions having a concentration of protuberances greater than that of other regions on the surface of the material, and said regions have an average width of 50 to 530 nm.

8. The chipping-proof nonmetal inorganic solid-state material according to claim 2, wherein there are regions having a concentration of protuberances greater than that of other regions on the surface of the material, and said regions have an average width of 50 to 530 nm.

9. The chipping-proof nonmetal inorganic solid-state material according to claim 3, wherein there are regions having a concentration of protuberances greater than that of other regions on the surface of the material, and said regions have an average width of 50 to 530 nm.

10. The chipping-proof nonmetal inorganic solid-state material according to claim 4, wherein there are regions having a concentration of protuberances greater than that of other regions on the surface of the material, and said regions have an average width of 50 to 530 nm.

11. The chipping-proof nonmetal inorganic solid-state material according to claim 5, wherein there are regions having a concentration of protuberances greater than that of other regions on the surface of the material, and said regions have an average width of 50 to 530 nm.

12. The chipping-proof nonmetal inorganic solid-state material according to claim 6, wherein there are regions having a concentration of protuberances greater than that of other regions on the surface of the material, and said regions have an average width of 50 to 530 nm.

13. The chipping-proof nonmetal inorganic solid-state material according to claim 1, wherein said surface structure is formed by irradiation with a gas cluster ion beam.

14. The chipping-proof nonmetal inorganic solid-state material according to claim 1, wherein there are regions having a concentration of protuberances greater than that of other regions on the surface of the material, said regions have an average width of 50 to 530 nm, and said surface structure is formed by irradiation with a gas cluster ion beam.

15. The chipping-proof nonmetal inorganic solid-state material according to claim 2, wherein said surface structure is formed by irradiation with a gas cluster ion beam.

16. The chipping-proof nonmetal inorganic solid-state material according to claim 2, wherein there are regions having a concentration of protuberances greater than that of other regions on the surface of the material, said regions have an average width of 50 to 530 nm, and said surface structure is formed by irradiation with a gas cluster ion beam.

17. A chipping-proof edge tool having a cutting part made of a chipping-proof nonmetal inorganic solid-state material according to claim 1.

18. A chipping-proof edge tool having a cutting part made of a chipping-proof nonmetal inorganic solid-state material according to claim 1, wherein there are regions having a concentration of protuberances greater than that of other regions on the surface of the material, and said regions have an average width of 50 to 530 nm.

19. A chipping-proof edge tool having a cutting part made of a chipping-proof nonmetal inorganic solid-state material according to claim 1, wherein said surface structure is formed by irradiation with a gas cluster ion beam.

20. A chipping-proof edge tool having a cutting part made of a chipping-proof nonmetal inorganic solid-state material according to claim 1, wherein there are regions having a concentration of protuberances greater than that of other regions on the surface of the material, said regions have an average width of 50 to 530 nm, and said surface structure is formed by irradiation with a gas cluster ion beam.

21. A chipping-proof edge tool having a cutting part made of a chipping-proof nonmetal inorganic solid-state material according to claim 2.

22. A chipping-proof edge tool having a cutting part made of a chipping-proof nonmetal inorganic solid-state material according to claim 2, wherein there are regions having a concentration of protuberances greater than that of other regions on the surface of the material, and said regions have an average width of 50 to 530 nm.

23. A chipping-proof edge tool having a cutting part made of a chipping-proof nonmetal inorganic solid-state material according to claim 2, wherein said surface structure is formed by irradiation with a gas cluster ion beam.

24. A chipping-proof edge tool having a cutting part made of a chipping-proof nonmetal inorganic solid-state material according to claim 2, wherein there are regions having a concentration of protuberances greater than that of other regions on the surface of the material, said regions have an average width of 50 to 530 nm, and said surface structure is formed by irradiation with a gas cluster ion beam.

25. A chipping-proof edge tool made of a chipping-proof nonmetal inorganic solid-state material, wherein a cutting part of said edge tool has, on a surface thereof, a surface structure in which a network of recesses and protuberances surrounded by the recesses are formed, said protuberances have an average width of 5 nm to 50 nm, and a physical property of said surface structure differs from the physical property of an interior of said inorganic solid-state material lying below said surface structure, and there is no solid-solid interface between said surface structure and the interior of said inorganic solid-state material.

* * * * *